United States Patent
Ishii et al.

(10) Patent No.: US 12,173,199 B2
(45) Date of Patent: Dec. 24, 2024

(54) PHOTOCURABLE ADHESIVE SHEET, ADHESIVE SHEET LAMINATE, LAMINATE FOR IMAGE DISPLAY DEVICE, AND IMAGE DISPLAY DEVICE

(71) Applicant: Mitsubishi Chemical Corporation, Tokyo (JP)

(72) Inventors: Kahoru Ishii, Tokyo (JP); Daiki Nozawa, Tokyo (JP); Makoto Inenaga, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 794 days.

(21) Appl. No.: 17/152,932

(22) Filed: Jan. 20, 2021

(65) Prior Publication Data

US 2021/0139744 A1    May 13, 2021

Related U.S. Application Data

(63) Continuation of application No. PCT/JP2019/030798, filed on Aug. 6, 2019.

(30) Foreign Application Priority Data

Aug. 6, 2018    (JP) .................................. 2018-147326

(51) Int. Cl.
  *C09J 7/24*    (2018.01)
  *C08F 2/50*    (2006.01)
  (Continued)

(52) U.S. Cl.
  CPC ................. *C09J 7/245* (2018.01); *C08F 2/50* (2013.01); *C08F 220/14* (2013.01);
  (Continued)

(58) Field of Classification Search
  CPC ....... C09J 7/245; C09J 4/40; C09J 7/38; C09J 7/385; C09J 2467/005; C09J 2203/318;
  (Continued)

(56) References Cited

U.S. PATENT DOCUMENTS

2012/0156456 A1    6/2012    Niimi et al.
2012/0328890 A1    12/2012    Niimi et al.
(Continued)

FOREIGN PATENT DOCUMENTS

CN    102471650 A    5/2012
CN    106104658 A    11/2016
(Continued)

OTHER PUBLICATIONS

International Search Report issued Oct. 8, 2019 in PCT/JP2019/030798 filed Aug. 6, 2019, 2 pages.
(Continued)

*Primary Examiner* — Scott R. Walshon
(74) *Attorney, Agent, or Firm* — Oblon, McClelland, Maier & Neustadt, L.L.P.

(57) ABSTRACT

A photocurable adhesive sheet may have both step conformability and shape stability and excellent in durability after attachment to an adhering member. Such a photocurable adhesive sheet may include a first adhesive layer, a second adhesive layer, and an intermediate layer interposed between the first and second adhesive layer. The intermediate layer may be a layer that is formed from a resin composition containing a (meth)acrylic copolymer as a main component resin and has a crosslinked structure. The first and/or second adhesive layer may be photocurable resin layers formed from a photocurable resin composition. The fall time in the measurement of holding force at 40° C. under a load of 1 N/cm² may be 60 minutes or more, while the fall time in the
(Continued)

measurement of holding force at 60° C. under a load of 1 N/cm² may be less than 60 minutes.

20 Claims, 1 Drawing Sheet

(51) Int. Cl.
| | |
|---|---|
| *C08F 220/14* | (2006.01) |
| *C08F 220/18* | (2006.01) |
| *C08F 220/20* | (2006.01) |
| *C08F 220/56* | (2006.01) |
| *C08F 222/10* | (2006.01) |
| *C08K 5/132* | (2006.01) |
| *C08K 5/5397* | (2006.01) |
| *C08L 51/00* | (2006.01) |
| *C09J 7/40* | (2018.01) |

(52) U.S. Cl.
CPC ...... *C08F 220/1811* (2020.02); *C08F 220/20* (2013.01); *C08F 220/56* (2013.01); *C08F 222/102* (2020.02); *C08F 222/103* (2020.02); *C08F 222/104* (2020.02); *C08K 5/132* (2013.01); *C08K 5/5397* (2013.01); *C08L 51/003* (2013.01); *C09J 7/40* (2018.01); *C08L 2312/06* (2013.01); *C09J 2203/318* (2013.01); *C09J 2301/124* (2020.08); *C09J 2451/001* (2013.01); *C09J 2467/005* (2013.01)

(58) Field of Classification Search
CPC ..... C09J 2301/124; C08F 220/56; C08F 2/50; C08F 220/14; C08F 220/20
See application file for complete search history.

(56) References Cited

U.S. PATENT DOCUMENTS

| | | | |
|---|---|---|---|
| 2013/0177758 A1* | 7/2013 | Shigetomi | ............. C09J 133/10 428/354 |
| 2014/0162080 A1 | 6/2014 | Niimi et al. | |
| 2014/0162081 A1 | 6/2014 | Niimi et al. | |
| 2019/0329536 A1 | 10/2019 | Nimi et al. | |
| 2023/0109620 A1 | 4/2023 | Niimi et al. | |

FOREIGN PATENT DOCUMENTS

| | | |
|---|---|---|
| CN | 107709493 A | 2/2018 |
| DE | 38 72 797 T2 | 4/1994 |
| EP | 0 305 161 A2 | 3/1989 |
| EP | 0 305 161 B1 | 3/1989 |
| JP | 1-121386 A | 5/1989 |
| JP | WO 2010/027041 A1 | 3/2010 |
| JP | 4971529 B2 | 7/2012 |
| JP | 2012-184390 A | 9/2012 |
| JP | WO 2015/137178 A1 | 9/2015 |
| TW | 201141982 A1 | 12/2011 |
| TW | 201542378 A | 11/2015 |
| TW | 201716536 A | 5/2017 |
| TW | 201728718 A | 8/2017 |

OTHER PUBLICATIONS

Combined Chinese Office Action and Search Report issued Mar. 28, 2022, in Chinese Patent Appiication No. 201980844968.5 (with English translation), 13 pages.

Combined Chinese Office Action and Search Report issued Mar. 28, 2022, in Chinese Patent Application No. 201980044968.5 (with English translation), 13 pages.

Taiwanese Office Action and Search Report issued May 26, 2023 in Taiwanese Application 108127914, (with English translation), 20 pages.

* cited by examiner

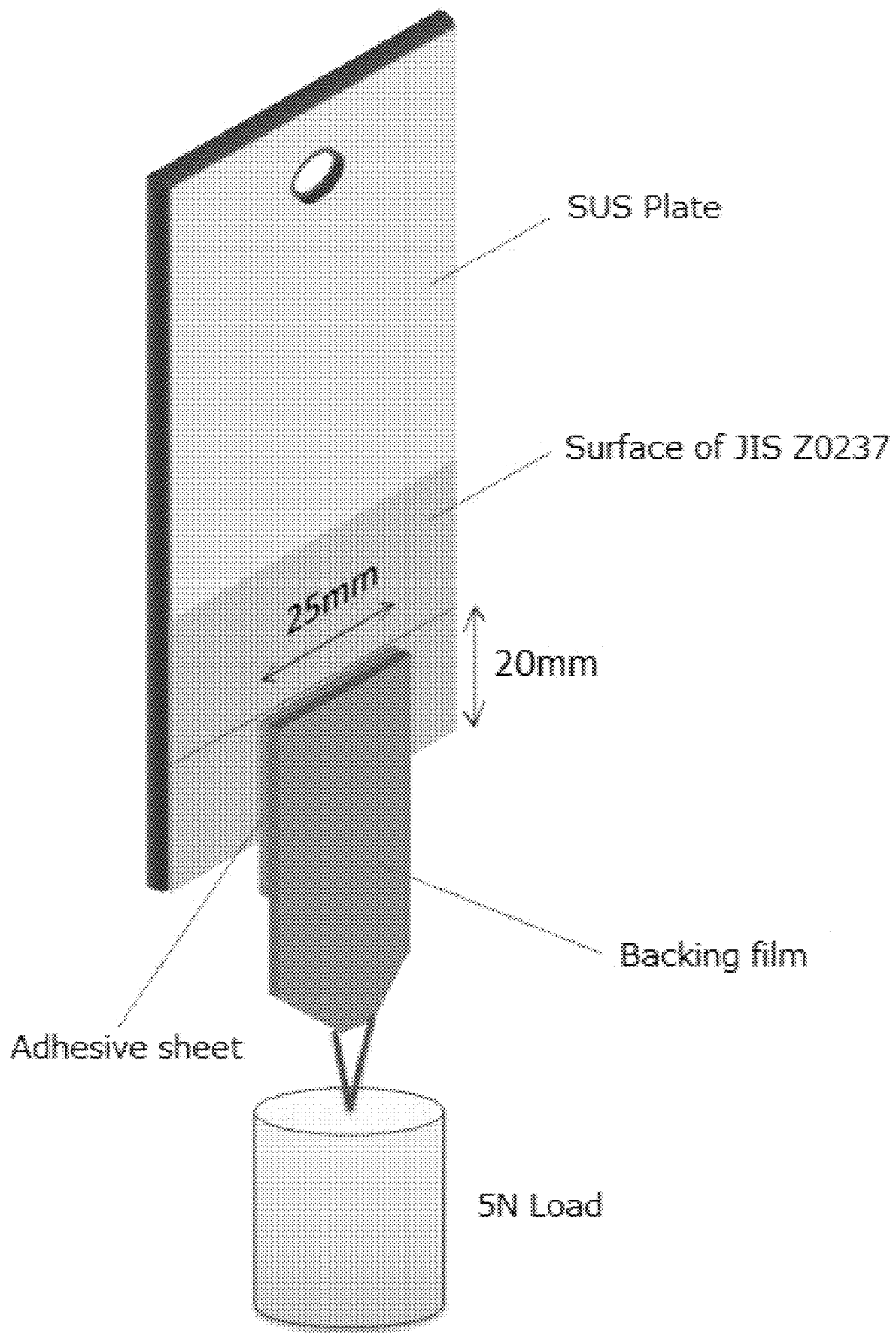

PHOTOCURABLE ADHESIVE SHEET, ADHESIVE SHEET LAMINATE, LAMINATE FOR IMAGE DISPLAY DEVICE, AND IMAGE DISPLAY DEVICE

CROSS-REFERENCE TO RELATED APPLICATIONS

The present application is a bypass continuation of international application PCT/JP2019/030798, filed on Aug. 6, 2019, and claims the benefit of the filing date of Japanese Appl. No. 2018-147326, filed on Aug. 6, 2018.

TECHNICAL FIELD

The present invention relates to a photocurable adhesive sheet excellent in conformability to steps, such as printed portions, and also in shape stability, as well as an adhesive sheet laminate, a laminate for an image display device, and an image display device using the same.

BACKGROUND ART

In recent years, in order to improve the visibility of an image display device, the space between an image display panel, such as a liquid crystal display (LCD), a plasma display (PDP), or an electroluminescence display (ELD), and a protection panel or touch panel member placed on its front side (visual recognition side) is filled with an adhesive sheet, a liquid adhesive, or the like, thereby suppressing the reflection of incoming light or outgoing light from a displayed image at the air-layer interface.

As a method for filling such a space between constituent members for an image display device using an adhesive, for example, PTL 1 discloses a method in which the space is filled with a liquid adhesive resin composition containing a UV-curable resin, followed by irradiation with UV light to cause curing.

In addition, a method in which a space between constituent members for an image display device is filled using an adhesive sheet is also known. For example, PTL 2 discloses a method for producing a laminate for an image display device, which includes a configuration wherein an image display device constituent member is laminated on at least one side of a transparent double-sided adhesive sheet, the method including attaching an adhesive sheet primarily crosslinked with UV light to an image display device constituent member, and then irradiating the adhesive sheet with UV light through the image display device constituent member to cause secondary curing.

Further, for example, PTL 3 discloses a method in which an image display device constituent member is attached using an adhesive sheet containing an adhesive resin composition that contains an acrylic copolymer composed of a graft copolymer having a macromonomer as a branch component (A), a crosslinker (B), and a photopolymerization initiator (C), and then irradiated with an active energy beam through the image display device constituent member to crosslink the adhesive resin composition, thereby causing the adhesion of the image display device constituent member.

CITATION LIST

Patent Literature

PTL 1: WO 2010/027041
PTL 2: Japanese Patent No. 4971529
PTL 3: WO 2015/137178

SUMMARY OF INVENTION

Technical Problem

A peripheral edge portion of a surface protection panel constituting an image display device often has printed thereon a frame-shaped concealing layer. An adhesive sheet for the attachment of a constituent member having such a printed portion is required to have step conformability, allowing the space to be entirely filled conforming to the printed portion or like steps. At the same time, in order to prevent strain or deformation of the adhesive sheet, high flowability is required.

Meanwhile, when the flowability of the adhesive sheet is too high, it is likely to happen that the adhesive undergoes glue overflow from an end of an adhesive sheet wound body before cutting (adhesive sheet roll) or a cut chip-processed article (adhesive sheet cut article). Therefore, the adhesive sheet is also required to have moderate shape stability.

Further, with the reduction in thickness and weight of image display devices, surface protection panels have been changed from conventional glass plates to plastic plates, such as acrylic plates and polycarbonate plates. In the case where a surface protection panel is a plastic plate, for example, when a laminate of the plastic plate and an adhesive sheet is exposed to high-temperature and high-humidity conditions, bubbles may be formed near steps, or outgas may be generated from the plastic plate, resulting in foaming, floating, delamination, or the like. Therefore, the durability after attachment to an adherend member also needs to be high.

Thus, an object of the present invention is to provide a photocurable adhesive sheet having both step conformability and shape stability and also excellent in durability after attachment to an adherend member, as well as an adhesive sheet laminate, a laminate for an image display device, and an image display device using the same.

Solution to Problem

The present invention proposes a photocurable adhesive sheet including a first adhesive layer, a second adhesive layer, and an intermediate layer interposed between the first adhesive layer and the second adhesive layer, and characterized in that the intermediate layer is a layer that is formed from a resin composition containing a (meth)acrylic copolymer as a main component resin and has a crosslinked structure,
the first adhesive layer and/or the second adhesive layer is a photocurable resin layer that is formed from a photocurable resin composition, and
the fall time in the measurement of holding force at 40° C. under a load of 1 N/cm$^2$ is 60 minutes or more, while the fall time in the measurement of holding force at 60° C. under a load of 1 N/cm$^2$ is less than 60 minutes.

Advantageous Effects of Invention

According to the photocurable adhesive sheet proposed by the present invention, when attachment to an adherend member is performed through the photocurable adhesive sheet, followed by irradiation with light, at least one of the first adhesive layer and the second adhesive layer can be photocured to enhance the cohesion. As a result, the durability of the photocurable adhesive sheet can be enhanced.

Meanwhile, the sheet before photocuring can be flexible and thus can be provided with step conformability, and, in addition, because the intermediate layer has a crosslinked structure, the shape stability of the entire adhesive sheet can also be ensured.

BRIEF DESCRIPTION OF DRAWINGS

FIG. 1 is a diagram explaining the method for the measurement of holding force performed in the Examples.

DESCRIPTION OF EMBODIMENTS

Next, the present invention will be described based on embodiment examples. However, the present invention is not limited to the embodiments described below.

<<<Present Adhesive Sheet>>>

The photocurable adhesive sheet according to an example of an embodiment of the present invention (referred to as "present adhesive sheet") is a double-sided adhesive sheet including a first adhesive layer, a second adhesive layer, and an intermediate layer interposed between the first adhesive layer and the second adhesive layer.

Incidentally, other layers may also be interposed between the first adhesive layer and the intermediate layer or between the second adhesive layer and the intermediate layer.

The present adhesive sheet has photocurability, and the first adhesive layer and/or the second adhesive layer has photocurability. The intermediate layer may or may not have photocurability.

Incidentally, in the present invention, "photocurability" means the property of being cured by irradiation with light. Specifically, for example, the term means the property of being cured by irradiation with a light beam having a wavelength region in the region of wavelengths of 200 nm to 780 nm, and, above all, it is preferable to have the property of being cured by irradiation with a light beam having a wavelength region in the region of wavelengths of 280 nm to 430 nm.

<<Intermediate Layer>>

The intermediate layer of the present adhesive sheet is a layer that is formed from a resin composition containing a (meth)acrylic copolymer as a main component resin (referred to as "intermediate layer-forming resin composition") and has a crosslinked structure.

Because the intermediate layer has a crosslinked structure, the shape stability of the present adhesive sheet can be enhanced, making it possible to enhance processability for cutting or the like, for example. In addition to this, durability can also be enhanced, making it possible to suppress glue overflow from an end face of the adhesive sheet during long-term storage, for example.

Incidentally, in the present invention, "main component resin" means a resin having the highest mass proportion in the resin composition forming each layer, and, within a range where the function of the main component resin is not hindered, the presence of other resins is allowed. In this case, the proportion of the main component resin contained in the resin constituting each layer is 50 mass % or more, preferably 70 mass % or more, and particularly preferably 90 mass % or more (including 100%).

In addition, in the present invention, the meaning of "(meth)acryl" encompasses acryl and methacryl, "(meth)acryloyl" encompasses acryloyl and methacryloyl, and "(meth)acrylate" encompasses acrylate and methacrylate. The meaning of "(co)polymer" encompasses polymer and copolymer.

<Crosslinked Structure>

It is preferable that the crosslinked structure is a physically crosslinked structure and/or a chemically crosslinked structure.

The physically crosslinked structure refers to a structure in which polymer chains are not crosslinked through a chemical bond, but are (pseudo-) crosslinked by a noncovalent bond due to the interaction within polymer chains or between polymer chains. Meanwhile, the chemically crosslinked structure refers to a structure in which polymer chains are crosslinked through a chemical covalent bond.

In a physically crosslinked structure, the interaction between polymer chains is weakened by temperature, pressure, or the like, and the flowability increases with a rise in temperature or the like. Meanwhile, in a chemically crosslinked structure, such flowability can be controlled. Therefore, it is more preferable that the intermediate layer has a chemically crosslinked structure, such as a chemically crosslinked structure formed by a resin composition containing a (meth)acrylic copolymer.

For the formation of a physically crosslinked structure, for example, a method in which a (meth)acrylic copolymer having a microphase-separated structure, such as a graft copolymer having a macromonomer as a branch component, is selected, or a (meth)acrylic copolymer (pseudo-) crosslinked by a noncovalent bond due to the interaction within polymer chains or between polymer chains, such as a graft copolymer having a macromonomer as a branch component, is selected, thereby forming a physically crosslinked structure, can be mentioned.

In addition, in the case of using a polyfunctional monomer as a photocrosslinker or the like, a method in which the polyfunctional monomer itself is crosslinked to have a three-dimensional network structure, and the chain-like (meth)acrylic copolymer entangles with the three-dimensional network structure, thereby forming a physically crosslinked structure, is also possible. However, these methods are non-limiting.

Incidentally, as a result of using the graft copolymer as the (meth)acrylic copolymer, in a room temperature state, high-affinity backbone components or branch components attract each other, whereby the (meth)acrylic copolymer has a microphase-separated structure. As a result, as a resin composition (adhesive), a state like a physically crosslinked state can be maintained, making it possible to retain the shape.

Meanwhile, for the formation of a chemically crosslinked structure, for example, a method in which a crosslinker that reacts with a crosslinkable functional group present in the molecule of the (meth)acrylic copolymer to form a chemically crosslinked structure, such as a covalent bond or an ionic bond, is used, a method in which hydrogen is abstracted from the (meth)acrylic copolymer using a hydrogen abstraction photoinitiator to form a reaction starting point, and a crosslinked structure is formed within polymers and/or between polymers of the (meth)acrylic copolymer or with other compositional components, a method in which a photocrosslinker having at least one functional group selected from the group consisting of an amino group, a hydroxyl group, and a carboxyl group (above all, a polyfunctional monomer having such a functional group) is combined with another crosslinker having a functional group that reacts with the functional group, such as an isocyanate-based compound, to form a chemically crosslinked structure, a method in which the functional group of the photocrosslinker is allowed to react with the isocyanate group of an isocyanate-based compound to form a chemically crosslinked structure between the photocrosslinkers, a method in which polyfunctional monomers used as photo-crosslinkers or the like are chemically bonded to each other to form a chemically crosslinked structure, and the like can be mentioned. However, these methods are non-limiting.

Thus, as the crosslinked structure of the intermediate layer, a crosslinked structure formed by a reaction between the (meth)acrylic copolymer and the crosslinker, a crosslinked structure formed by a reaction between the (meth) acrylic copolymers, a crosslinked structure formed by a reaction between the crosslinkers, and two or more of these crosslinked structures can be mentioned. However, these examples are non-limiting.

In the present invention, whether the photocurable adhesive sheet has a chemically crosslinked structure can be judged by measuring the gel fraction. For example, when the gel fraction of a photocurable adhesive sheet is 5% or more, preferably 10% or more, the sheet can be judged as having a crosslinked structure. However, the method for judging the presence of a chemically crosslinked structure is not limited to such a method using gel fraction measurement.

In this case, the gel fraction can be measured through the following procedures 1) to 4).

1) An adhesive composition is weighed (W1) and wrapped in a previously weighed 200-mesh SUS mesh (W0).
2) The SUS mesh is immersed in 100 mL of ethyl acetate for 24 hours.
3) The SUS mesh is removed and dried at 75° C. for 4.5 hours.
4) The weight after drying (W2) is determined, and the gel fraction of the adhesive composition is measured using the following formula.

Gel fraction (%)=100×(*W*2−*W*0)/*W*1

In addition, in the present invention, whether a physically crosslinked structure through a macromonomer has been formed can be judged by analyzing the microphase-separated structure. Specifically, as described in WO 2018/101252, in small-angle X-ray scattering measurement, the half-width X1 of the one-dimensional scattering profile is measured, and, for example, when the half-width X1 (nm-1) is 0.05<X1<0.30, it can be judged that a physically crosslinked structure has been formed.

However, the method for judging the presence of a physically crosslinked structure is not limited to the above method.

<Intermediate Layer-Forming Resin Composition>

It is necessary that the intermediate layer-forming resin composition is a resin composition containing a (meth) acrylic copolymer as a main component resin and capable of forming the crosslinked structure described above.

As a specific example, in addition to the (meth)acrylic copolymer, a crosslinker as necessary, a photoinitiator as necessary, and further other components as necessary may also be contained.

<(Meth)Acrylic Copolymer>

It is preferable that the (meth)acrylic copolymer as a main component resin of the intermediate layer is a (meth)acrylic copolymer containing a structural unit represented by the following formula (1) in an amount of 50 mass % or more.

Incidentally, in the following formula (1), $R_1$ represents a hydrogen atom or a methyl group, and $R_2$ represents a $C_{4-18}$ linear or branched alkyl group.

$$CH_2=CH(R_1)-COO(R_2) \qquad \text{Formula 1}$$

In terms of securing flexibility and step absorbability as an adhesive sheet, it is preferable that the (meth)acrylic copolymer has a structural unit represented by the above formula 1, a so-called monomer component, in an amount of 50 mass % or more, and, from the same point of view, especially 55 mass % or more, and yet especially particularly preferably 60 mass % or more.

As monomers represented by the above formula 1, for example, n-butyl (meth)acrylate, isobutyl (meth)acrylate, sec-butyl (meth)acrylate, t-butyl (meth)acrylate, pentyl (meth)acrylate, isopentyl (meth)acrylate, neopentyl (meth) acrylate, hexyl (meth)acrylate, cyclohexyl (meth)acrylate, heptyl (meth)acrylate, 2-ethylhexyl (meth)acrylate, 2-ethylhexyl EO-modified (meth)acrylate, n-octyl (meth)acrylate, isooctyl (meth)acrylate, nonyl (meth)acrylate, isononyl (meth)acrylate, t-butylcyclohexyl (meth)acrylate, decyl (meth)acrylate, isodecyl (meth)acrylate, undecyl (meth) acrylate, lauryl (meth)acrylate, tridecyl (meth)acrylate, tetradecyl (meth)acrylate, cetyl (meth)acrylate, stearyl (meth) acrylate, isostearyl (meth)acrylate, isobornyl (meth)acrylate, 3,5,5-trimethylcyclohexane (meth)acrylate, dicyclopentanyl (meth)acrylate, dicyclopentanyl (meth)acrylate, dicyclopentenyloxyethyl (meth)acrylate, and the like can be mentioned. They may be used alone, and it is also possible to use a combination of two or more kinds. They can be used alone, and it is also possible to use two or more kinds together.

Among the above examples, it is particularly preferable to contain at least one of butyl (meth)acrylate, 2-ethylhexyl (meth)acrylate, and lauryl (meth)acrylate.

The (meth)acrylic copolymer is a copolymer composed of a component containing "additional copolymerizable monomers" other than the above monomer components.

As the "additional copolymerizable monomers", for example, (a) carboxyl group-containing monomers (hereinafter also referred to as "copolymerizable monomers A"), (b) hydroxyl group-containing monomers (hereinafter also referred to as "copolymerizable monomers B"), (c) amino group-containing monomers (hereinafter also referred to as "copolymerizable monomers C"), (d) epoxy group-containing monomers (hereinafter also referred to as "copolymerizable monomers D"), (e) amide group-containing monomers (hereinafter also referred to as "copolymerizable monomers E"), (f) vinyl monomers (hereinafter also referred to as "copolymerizable monomers F"), (g) (meth)acrylate monomers wherein the number of carbon atoms in the side chain is 1 to 3 (hereinafter also referred to as "copolymerizable monomers G"), (h) macromonomers (hereinafter also referred to as "copolymerizable monomers H"), (i) aromatic-containing monomers (hereinafter also referred to as "copolymerizable monomers I"), and (j) other functional group-containing monomers (hereinafter also referred to as "copolymerizable monomer J") can be mentioned. They can be used alone, and it is also possible to use two or more kinds together.

Among them, in terms of the crosslinked structure of the intermediate layer, the copolymerizable monomers A, B, and C are particularly preferable.

In addition, it is preferable that the (meth)acrylic copolymer contains the "additional copolymerizable monomer" in a proportion of 1 to 30 mass %, especially more preferably 2 mass % or more and 25 mass % or less.

As the copolymerizable monomers A, for example, (meth) acrylic acid, carboxyethyl (meth)acrylate, carboxypropyl (meth)acrylate, carboxybutyl (meth)acrylate, co-carboxy-polycaprolactone mono(meth)acrylate, 2-(meth)acryloyloxyethyl hexahydrophthalic acid, 2-(meth)acryloyloxypropyl hexahydrophthalic acid, 2-(meth)acryloyloxyethyl phthalic acid, 2-(meth)acryloyloxypropyl phthalic acid, 2-(meth)acryloyloxyethyl maleic acid, 2-(meth)acryloyloxypropyl maleic acid, 2-(meth)acryloyloxyethyl succinic acid, 2-(meth)acryloyloxypropyl succinic acid, crotonic acid, fumaric acid, maleic acid, and itaconic acid can be mentioned. They may be used alone, and it is also possible to use a combination of two or more kinds.

As the copolymerizable monomers B, for example, hydroxyalkyl (meth)acrylates such as 2-hydroxyethyl (meth)acrylate, 2-hydroxypropyl (meth)acrylate, 3-hydroxypropyl (meth)acrylate, and 2-hydroxybutyl (meth)acrylate can be mentioned. They may be used alone, and it is also possible to use a combination of two or more kinds.

As the copolymerizable monomers C, for example, aminoalkyl (meth)acrylates, such as aminomethyl (meth)acrylate, aminoethyl (meth)acrylate, aminopropyl (meth)acrylate, and aminoisopropyl (meth)acrylate, and N,N-dialkylaminoalkyl (meth)acrylates, such as N-alkylamino alkyl (meth)acrylate, N,N-dimethylaminoethyl (meth)acrylate, and N,N-dimethylaminopropyl (meth)acrylate, can be mentioned. They may be used alone, and it is also possible to use a combination of two or more kinds.

As the copolymerizable monomers D, for example, glycidyl (meth)acrylate, methylglycidyl (meth)acrylate, 3,4-epoxycyclohexylmethyl (meth)acrylate, and 4-hydroxybutyl (meth)acrylate glycidyl ether can be mentioned. They may be used alone, and it is also possible to use a combination of two or more kinds.

As the copolymerizable monomers E, for example, (meth)acrylamide, N,N-dimethyl (meth)acrylamide, N-butyl (meth)acrylamide, N-methylol (meth)acrylamide, N-methylolpropane (meth)acrylamide, N-methoxymethyl (meth)acrylamide, N-butoxymethyl (meth)acrylamide, diacetone (meth)acrylamide, maleic acid amide, and maleimide can be mentioned. They may be used alone, and it is also possible to use a combination of two or more kinds.

As the copolymerizable monomers F, compounds having a vinyl group in the molecule can be mentioned. Such compounds can be exemplified by (meth)acrylic acid alkyl esters having a $C_{1-12}$ alkyl group, functional monomers having a functional group such as a hydroxyl group, an amide group, or an alkoxyalkyl group in the molecule, polyalkylene glycol di(meth)acrylates, vinyl ester monomers such as vinyl acetate, N-vinyl-2-pyrrolidone, vinyl propionate, and vinyl laurate, and aromatic vinyl monomers such as styrene, chlorostyrene, chloromethyl styrene, α-methyl styrene, and other substituted styrenes. They may be used alone, and it is also possible to use a combination of two or more kinds.

As the copolymerizable monomers G, for example, methyl (meth)acrylate, ethyl (meth)acrylate, n-propyl (meth)acrylate, i-propyl (meth)acrylate, and the like can be mentioned. They may be used alone, and it is also possible to use a combination of two or more kinds.

A macromonomer as the copolymerizable monomer H is a high-molecular-weight monomer having a terminal functional group and a high-molecular-weight skeleton component, and it is preferable that when such a monomer is polymerized into a (meth)acrylic ester copolymer, the number of carbon atoms in the side chain is 20 or more.

When the copolymerizable monomer H is used, a macromonomer can be introduced as a branch component of a graft copolymer, making it possible to form a (meth)acrylic ester copolymer as a graft copolymer, such as a (meth)acrylic ester copolymer composed of a graft copolymer having a macromonomer as a branch component, for example.

Therefore, depending on the selection of the copolymerizable monomer H and other monomers and their blending ratio, the characteristics of the main and side chains of a graft copolymer can be changed.

It is preferable that the skeleton component of the macromonomer is composed of an acrylic ester polymer or a vinyl-based polymer. For example, linear or branched alkyl (meth)acrylates wherein the number of carbon atoms in the side chain is 4 to 18 and those exemplified by the copolymerizable monomers A, the copolymerizable monomers B, the copolymerizable monomers G, and the like can be mentioned. They can be used alone, and it is also possible to use a combination of two or more kinds.

As the copolymerizable monomers I, for example, benzyl (meth)acrylate, phenoxyethyl (meth)acrylate, 2-hydroxy-3-phenoxypropyl (meth)acrylate, nonylphenol EO-modified (meth)acrylate, and the like can be mentioned. They may be used alone, and it is also possible to use a combination of two or more kinds.

As the copolymerizable monomers J, for example, (meth)acrylic-modified silicone, fluorine-containing monomers such as 2,2,2-trifluoroethyl (meth)acrylate, 2,2,3,3-tetrafluoropropyl (meth)acrylate, 2,2,3,3-tetrafluoropropyl (meth)acrylate, 1H,1H,5H-octafluoropentyl (meth)acrylate, and 1H,1H,2H,2H-tridecafluoro-n-octyl (meth)acrylate, and the like can be mentioned. They may be used alone, and it is also possible to use a combination of two or more kinds.

Especially, in terms of forming a crosslinked structure in the intermediate layer, as described above, a (meth)acrylic copolymer composed of a graft copolymer having a macromonomer as a branch component, such as a (meth)acrylic copolymer composed of a graft copolymer obtained by the polymerization of a monomer mixture containing a macromonomer having a number average molecular weight of 500 or more and 100,000 or less and a vinyl monomer, is preferable in that a physically crosslinked structure can be formed in the intermediate layer.

In addition, it is preferable that the (meth)acrylic copolymer has a functional group capable of reacting with a crosslinker, such as a compound having an isocyanate group or a compound having a glycidyl group, to form a chemical bond. Especially, a (meth)acrylic copolymer having a "crosslinkable functional group" capable of reacting with such a crosslinker to form a crosslinked structure is preferable in that a chemically crosslinked structure can be formed in the intermediate layer.

As such crosslinkable functional groups, a hydroxyl group, a carboxyl group, an amino group, an amide group, and the like can be mentioned, and one of them or a combination of two or more of them can be mentioned. Especially, in terms of the ease of controlling reactivity with a crosslinker, a hydroxyl group or a carboxyl group is preferable.

In addition, it is also possible that a metal oxide or an organic metal chelating agent is contained in the intermediate layer to form a crosslinked structure through ionic crosslinking.

<Crosslinker>

As described above, the intermediate layer-forming resin composition may contain a crosslinker in addition to the (meth)acrylic copolymer, and it is especially preferable to contain a photocrosslinker and/or an isocyanate-based crosslinker.

In the case where the intermediate layer-forming resin composition contains a crosslinker, as the crosslinked structure of the intermediate layer, a crosslinked structure formed by a reaction between the (meth)acrylic copolymer and the crosslinker, a crosslinked structure formed by a reaction between the (meth)acrylic copolymers, a crosslinked structure formed by a reaction between the crosslinkers, and two or more of these crosslinked structures can be mentioned.

(Isocyanate-Based Crosslinker)

When the intermediate layer-forming resin composition contains a crosslinker composed of a compound having an isocyanate group (referred to as "isocyanate-based crosslinker"), the isocyanate-based crosslinker can react with a crosslinkable functional group present in the molecule of the (meth)acrylic copolymer to form a chemical bond or crosslinked structure.

In addition, when the intermediate layer is formed from a composition containing a compound having at least one functional group selected from the group consisting of a hydroxyl group, a carboxyl group, and an amino group, for example, specifically a (meth)acrylic copolymer having the functional group, the functional group of the copolymer can react with the isocyanate-based crosslinker to form a chemical bond or crosslinked structure.

As the isocyanate-based crosslinker, for example, isocyanate-based compounds such as 2,4-tolylene diisocyanate, 2,6-tolylene diisocyanate, hydrogenated tolylene diisocyanate, 1,3-xylylene diisocyanate, 1,4-xylylene diisocyanate, hexamethylene diisocyanate, diphenylmethane 4,4-diisocyanate, isophorone diisocyanate, 1,3-bis(isocyanatomethyl) cyclohexane, tetramethylxylylene diisocyanate, 1,5-naphthalene diisocyanate, and triphenylmethane triisocyanate can be mentioned.

In addition, adducts of these isocyanate-based compounds and polyol compounds such as trimethylolpropane, biurets or isocyanurates of these polyisocyanate compounds, and the like can also be used.

Above all, in terms of excellent pot life, compatibility with resins, and durability, aliphatic isocyanates and biurets thereof are preferable.

Especially, in terms of securing the pot life, a blocked isocyanate-based crosslinker in which the isocyanate group is protected with a blocking agent such as dimethylpyrazole, methyl ethyl ketone oxime, or caprolactam is particularly preferable.

When the content of the isocyanate-based crosslinker is too low, the effect of adding an isocyanate-based crosslinker cannot be obtained. Meanwhile, when the content is too high, the pot life of the intermediate layer resin composition decreases, or the flexibility as an adhesive sheet is impaired. Therefore, the proportion per 100 parts by mass of the (meth)acrylic copolymer is preferably 0.001 parts by mass or more and 10 parts by mass or less, especially 0.05 parts by mass or more and 5 parts by mass or less, and yet especially 0.1 parts by mass or more and 3 parts by mass or less.

(Photocrosslinker)

As photocrosslinkers, photopolymerizable compounds can be mentioned. More specifically, compounds having a carbon-carbon double bond in the molecule, above all, monomer components and oligomer components having a carbon-carbon double bond in the molecule, can be mentioned. Especially, polyfunctional monomers having two or more carbon-carbon double bonds in the molecule are preferable.

As a result of using such a polyfunctional monomer, polyfunctional monomers are chemically bonded to each other to form a chemically crosslinked structure formed of a three-dimensional network structure. In addition to this, the chain-like (meth)acrylic copolymer is entangled with the three-dimensional network structure, whereby the movement of polymers is restrained, and a physically agglomerated structure, that is, a physically crosslinked structure, can also be formed.

As the polyfunctional monomer, for example, UV-curable polyfunctional (meth)acrylic monomers such as 1,4-butanediol di(meth)acrylate, glycerin di(meth)acrylate, neopentyl glycol di(meth)acrylate, glycerin glycidyl ether di(meth)acrylate, 1,6-hexanediol di(meth)acrylate, 1,9-nonanediol di(meth)acrylate, tricyclodecane dimethacrylate, tricyclodecane dimethanol di(meth)acrylate, bisphenol A polyethoxy di(meth)acrylate, bisphenol A polypropoxy di(meth)acrylate, bisphenol F polyethoxy di(meth)acrylate, ethylene glycol di(meth)acrylate, neopentyl glycol (meth)acrylate, trimethylolpropanetrioxyethyl (meth)acrylate, ε-caprolactone-modified tris (2-hydroxyethyl)isocyanurate tri(meth)acrylate, pentaerythritol tri(meth)acrylate, propoxylated pentaerythritol tri(meth)acrylate, ethoxylated pentaerythritol tri(meth)acrylate, pentaerythritol tetra(meth)acrylate, propoxylated pentaerythritol tetra(meth)acrylate, ethoxylated pentaerythritol tetra(meth)acrylate, dipentaerythritol hexa(meth)acrylate, polyethylene glycol di(meth)acrylate, tris(acryloxyethyl) isocyanurate, dipentaerythritol hexa(meth)acrylate, dipentaerythritol penta(meth)acrylate, tripentaerythritol hexa(meth)acrylate, tripentaerythritol penta(meth)acrylate, hydroxypivalic acid neopentyl glycol di(meth)acrylate, di(meth)acrylate of an ε-caprolactone adduct of hydroxypivalic acid neopentyl glycol, trimethylolpropane tri(meth)acrylate, trimethylolpropane polyethoxy tri(meth)acrylate, and ditrimethylolpropane tetra(meth)acrylate, as well as polyfunctional (meth)acrylic oligomers such as polyester (meth)acrylate, epoxy (meth)acrylate, urethane (meth)acrylate, and polyether (meth)acrylate, can be mentioned. They may be used alone, and it is also possible to use a combination of two or more kinds.

In terms of reacting with an isocyanate-based crosslinker to form a chemically crosslinked structure as described above, it is preferable that the photocrosslinker is a compound having a functional group that reacts with an isocyanate-based crosslinker, such as at least one functional group selected from the group consisting of a hydroxyl group, a carboxyl group, and an amino group, more specifically a polyfunctional (meth)acrylate having at least one functional group selected from the group consisting of a hydroxyl group, a carboxyl group, and an amino group.

In the intermediate layer, a polyfunctional (meth)acrylate having such a functional group can form a chemical bond between the functional group and the isocyanate group of the isocyanate-based crosslinker. As a result, not only the cohesion of the intermediate layer can be enhanced, but storage stability and shape stability can also be improved.

As such polyfunctional (meth)acrylates, for example, polyfunctional (meth)acrylates such as glycerin di(meth)acrylate, pentaerythritol tri(meth)acrylate, alkylene glycol-modified pentaerythritol tri(meth)acrylates, dipentaerythritol poly(meth)acrylate, alkylene glycol-modified dipentaerythritol poly(meth)acrylates, isocyanuric acid EO-modified di(meth)acrylate, various epoxy (meth)acrylates and polyester (meth)acrylates obtained by adding (meth)acrylic acid to a glycidyl ether compound, and the like can be mentioned.

The intermediate layer-forming resin composition may further contain a monofunctional monomer in addition to the polyfunctional monomer. When a monofunctional monomer is contained, the viscoelastic behavior of the intermediate layer can be adjusted, the affinity with the adhesive layer can be improved, and the effect of suppressing hygrothermal whitening can be improved.

As such monofunctional monomers, for example, in addition to alkyl (meth)acrylates such as methyl acrylate, hydroxyl group-containing (meth)acrylates such as hydroxyethyl (meth)acrylate, hydroxypropyl (meth)acrylate, hydroxybutyl (meth)acrylate, glycerol (meth)acrylate, and polyalkylene glycol (meth)acrylates; carboxyl group-containing monomers such as (meth)acrylic acid, 2-(meth)acryloyloxyethylhexahydrophthalic acid, 2-(meth)acryloyloxypropyl hexahydrophthalic acid, 2-(meth)acryloyloxyethyl phthalic acid, 2-(meth)acryloyloxypropyl phthalic acid, 2-(meth)acryloyloxyethyl maleic acid, 2-(meth)acryloyloxypropyl maleic acid, 2-(meth)acryloyloxyethyl succinic acid, 2-(meth)acryloyloxypropyl succinic acid, crotonic acid, fumaric acid, maleic acid, itaconic acid, monomethyl maleate, and monomethyl itaconate; acid anhydride group-containing monomers such as maleic anhydride and itaconic anhydride; ether group-containing (meth)acrylates such as tetrahydrofurfuryl (meth)acrylate and methoxypolyethylene glycol (meth)acrylate; and (meth)acrylamide-based monomers such as (meth)acrylamide, dimethyl (meth)acrylamide, diethyl (meth)acrylamide, (meth)acryloyl morpholine, hydroxyethyl (meth)acrylamide, isopropyl (meth)acrylamide, dimethylaminopropyl (meth)acrylamide, phenyl (meth)acrylamide, N-t-butyl (meth)acrylamide, N-methylol(meth)acrylamide, N-methoxymethyl (meth)acrylamide, N-butoxymethyl (meth)acrylamide, and diacetone (meth)acrylamide; and the like can be mentioned.

Especially, in terms of improving the effect of suppressing hygrothermal whitening, it is preferable to use a hydroxyl group-containing (meth)acrylate or a (meth)acrylamide-based monomer.

In addition, when the monofunctional (meth)acrylate is a compound having a functional group that reacts with the isocyanate group of an isocyanate-based crosslinker, such as at least one functional group selected from the group consisting of a hydroxyl group, a carboxyl group, and an amino group, the cohesion of the intermediate layer composition can be enhanced; therefore, this is preferable.

When the content of the photocrosslinker (C) is too low, the effect of adding a photocrosslinker, that is, a desired degree of crosslinking, cannot be obtained. Meanwhile, when the content is too high, the crosslinker bleeds before photocrosslinking, the cohesion of the physical crosslink tends to be insufficient, or an adhesive sheet after photocrosslinking becomes so hard that the step absorbability is impaired. Therefore, the proportion per 100 parts by mass of the (meth)acrylic copolymer is preferably 0.5 parts by mass or more and 50 parts by mass or less, especially 1 part by mass or more and 40 parts by mass or less, and yet especially 5 parts by mass or more and 30 parts by mass or less.

(Additional Crosslinkers)

The intermediate layer-forming resin composition may contain, as "additional crosslinkers" other than the photocrosslinkers and isocyanate-based crosslinkers described above, for example, epoxy-based crosslinkers such as polyethylene glycol diglycidyl ether, diglycidyl ether, and trimethylolpropane triglycidyl ether, melamine resin-based crosslinkers, aziridine-based crosslinkers, oxazoline-based crosslinkers, urea-based crosslinkers, metal salt-based crosslinkers, metal chelate-based crosslinkers, amino resin-based crosslinkers, metal alkoxide-based crosslinkers, peroxide-based crosslinkers, and like crosslinkers.

Incidentally, these crosslinkers can be used alone, and it is also possible to use two or more kinds together.

As the content of the "additional crosslinker" other than a photocrosslinker and an isocyanate-based crosslinker, the proportion per 100 parts by mass of the (meta)acrylic ester (co)polymer is preferably 0.001 parts by mass or more and 10 parts by mass or less, especially 0.05 parts by mass or more and 5 parts by mass or less, and yet especially 0.1 parts by mass or more and 3 parts by mass or less.

<Photoinitiator>

As necessary, in the case where photocurability is imparted to the intermediate layer, for example, it is preferable that the intermediate layer-forming resin composition contains a photoinitiator.

Photoinitiators roughly fall into two categories depending on the radical generation mechanism, and are roughly divided into cleavage photoinitiators, which are capable of cleaving and decomposing the single bond of the photoinitiator itself to generate radicals, and hydrogen abstraction photoinitiators, in which a photoexcited initiator forms an excited complex with a hydrogen donor in the system, whereby hydrogen of the hydrogen donor can be transferred.

The photoinitiator used for the intermediate layer-forming resin composition may be a cleavage photoinitiator or a hydrogen abstraction photoinitiator. They may be independently used alone, or it is also possible to use a mixture of the two. Further, each may be used alone, or it is also possible to use two or more kinds of each together.

As cleavage photoinitiators, for example, 2,2-dimethoxy-1,2-diphenylethan-1-one, 1-hydroxycyclohexyl phenyl ketone, 2-hydroxy-2-methyl-1-phenyl-propane-1-one, 1-(4-(2-hydroxyethoxy)phenyl)-2-hydroxy-2-methyl-1-propane-1-one, 2-hydroxy-1-[4-{4-(2-hydroxy-2-methyl-propionyl)benzyl}phenyl]-2-methyl-propane-1-one, oligo(2-hydroxy-2-methyl-1-(4-(1-methylvinyl)phenyl)propanone), methyl phenylglyoxylate, 2-benzyl-2-dimethylamino-1-(4-morpholinophenyl)butane-1-one, 2-methyl-1-[4-(methylthio)phenyl]-2-morpholinopropan-1-one, 2-(dimethylamino)-2-[(4-methylphenyl)methyl]-1-[4-(4-morpholinyl)phenyl]-1-butanone, bis(2,4,6-trimethylbenzoyl)-phenyl phosphine oxide, 2,4,6-trimethylbenzoyl diphenyl phosphine oxide, (2,4,6-trimethylbenzoyl)ethoxyphenyl phosphine oxide, bis (2,6-dimethoxybenzoyl)2,4,4-trimethyl pentyl phosphine oxide, derivatives thereof, and the like can be mentioned.

As hydrogen abstraction photoinitiators, for example, benzophenone, 4-methyl-benzophenone, 2,4,6-trimethyl benzophenone, 4-phenyl benzophenone, 3,3'-dimethyl-4-methoxybenzophenone, 4-(meth)acryloyloxy benzophenone, methyl 2-benzoylbenzoate, methyl benzoylformate, bis(2-phenyl-2-oxoacetic acid)oxybisethylene, 4-(1,3-acryloyl-1,4,7,10,13-pentaoxotridecyl)benzophenone, thioxanthone, 2-chlorothioxanthone, 3-methylthioxanthone, 2,4-dimethylthioxanthone, 2-methylanthraquinone, 2-ethylanthraquinone, 2-tert-butylanthraquinone, 2-aminoanthraquinone, derivatives thereof, and the like can be mentioned.

The content of the photoinitiator is not particularly limited. As a guide, the proportion per 100 parts by mass of the (meth)acrylic copolymer is preferably 0.1 to 10 parts by mass, especially 0.5 parts by mass or more and 5 parts by mass or less, and yet especially 1 part by mass or more and 3 parts by mass or less.

<Other Components>

As components contained in the intermediate layer-forming resin composition other than those mentioned above, for example, as necessary, various additives such as tackifying resins, antioxidants, light stabilizers, metal deactivators, antioxidants, moisture absorbents, polymerization inhibitors, UV absorbers, rust preventives, silane coupling agents, and inorganic particles can be suitably contained.

In addition, as necessary, reaction catalysts (tertiary amine-based compounds, quaternary ammonium-based compounds, tin laurate compounds, etc.) may also be suitably contained.

<<First and Second Adhesive Layers>>

The first and second adhesive layers are layers located as the outermost layers of the present adhesive sheet.

<Adhesive Layer-Forming Resin Composition>

It is preferable that the resin composition forming the first adhesive layer, the second adhesive layer, or both of these layers (referred to as "adhesive layer-forming resin composition") is a photocurable resin composition having photocurability.

Incidentally, the resin composition forming the first adhesive layer and the resin composition forming the second adhesive layer may be of the same composition or different compositions.

<Main Component Resin>

It is preferable that the adhesive layer-forming resin composition contains, as a main component resin, a (meth) acrylic copolymer, an isobutylene-based polymer, a butadiene- or isoprene-based copolymer, a silicone-based polymer, a urethane-based polymer, or two or more kinds of them. Especially, in terms of adhesiveness with the intermediate layer, it is preferable that a (meth)acrylic copolymer is contained as a main component resin.

As an example of the adhesive layer-forming resin composition, the above photocurable resin composition containing a (meth)acrylic copolymer as a main component resin and containing a crosslinker and/or a photoinitiator can be mentioned.

((Meth)Acrylic Copolymer)

As the (meth)acrylic copolymer, the (meth)acrylic copolymers mentioned above in the description of the intermediate layer can be mentioned. Among them, those having a structural unit represented by the above formula 1 in an amount of 50 mass % or more, yet especially a copolymer of a monomer component containing, as the "additional copolymerizable monomer" described above, at least one of the copolymerizable monomers A, B, and C described above, are particularly preferable. In this case, it is preferable that the (meth)acrylic copolymer contains the "additional copolymerizable monomer" in a proportion of 1 to 30 mass %, especially more preferably 2 mass % or more and 25 mass % or less.

Especially, in terms of improving adhesiveness to an adherend and preventing hygrothermal whitening, it is preferable that a hydrophilic (meth)acrylate monomer is contained as a copolymerization component that constitutes the (meth)acrylic copolymer.

As the hydrophilic (meth)acrylate monomer, methyl acrylate or an ester having a polar group is preferable. For example, (meth)acrylic acid, tetrahydrofurfuryl (meth)acrylate, hydroxyl group-containing (meth)acrylates such as hydroxyethyl (meth)acrylate, hydroxypropyl (meth)acrylate, hydroxybutyl (meth)acrylate, and glycerol (meth)acrylate, carboxyl group-containing monomers such as (meth) acrylic acid, β-carboxyethyl acrylate, 2-(meth)acryloyloxyethyl hexahydrophthalic acid, 2-(meth)acryloyloxypropyl hexahydrophthalic acid, 2-(meth)acryloyloxyethyl phthalic acid, 2-(meth)acryloyloxypropyl phthalic acid, 2-(meth)acryloyloxyethyl maleic acid, 2-(meth)acryloyloxypropyl maleic acid, 2-(meth)acryloyloxyethyl succinic acid, 2-(meth)acryloyloxypropyl succinic acid, crotonic acid, fumaric acid, maleic acid, itaconic acid, monomethyl maleate, and monomethyl itaconate, acid anhydride group-containing monomers such as maleic anhydride and itaconic anhydride, epoxy group-containing monomers such as glycidyl (meth)acrylate, glycidyl α-ethyl acrylate, and (meth)acrylate 3,4-epoxybutyl, alkoxypolyalkylene glycol (meth)acrylates such as methoxypolyethylene glycol (meth)acrylate, acrylamide, N,N-dimethylacrylamide, hydroxyethylacrylamide, and the like can be mentioned.

Further, as the (meth)acrylic copolymer as a main component resin of the adhesive layer-forming resin composition, the (meth)acrylic ester copolymer composed of a graft copolymer having a macromonomer as a branch component described above, such as a (meth)acrylic copolymer composed of a graft copolymer obtained by the polymerization of a monomer mixture containing a macromonomer having a number average molecular weight of 500 or more and 100,000 or less and a vinyl monomer, is also preferable.

In a (meth)acrylic ester copolymer composed of a graft copolymer having a macromonomer as a branch component, at an ambient temperature state, branch components attract each other to form a physically crosslinked structure, making it possible to retain the shape. Meanwhile, upon heating, the physically crosslinked structure can be loosened to impart flowability, making it possible to enhance the step conformability.

<Photocrosslinker/Photoinitiator>

It is preferable that the adhesive layer-forming resin composition contains a photocrosslinker and/or a photoinitiator in addition to the main component resin described above.

As the photocrosslinker and the photoinitiator contained in the adhesive layer-forming resin composition, the same photocrosslinkers and photoinitiators as those mentioned above in the description of the intermediate layer can be used, respectively, and preferred examples are also the same.

<Other Components>

The adhesive layer-forming resin composition can contain, as components other than those mentioned above, as necessary, the same components as those contained in the intermediate layer-forming resin composition.

<Preferred Mode of First/Second Adhesive Layer>

It is preferable that the first/second adhesive layer has photocurability in a shape-retained state.

Like this, in order for the first/second adhesive layer to have photocurability in a shape-retained state, a case where the first/second adhesive layer is retained in shape in a once cured (pre-cured) state and also has photocurability (activity) (referred to as "mode (1)") and a case where the first/second adhesive layer is retained in shape in an uncured state, in which the layer has never been cured, and also has photocurability (activity) (referred to as "mode (2)") can be mentioned.

As a specific example of the mode (1), for example, an example in which a photocurable resin composition containing a photoinitiator, a (meth)acrylate copolymer having a functional group (i), a compound having a functional group (ii) that reacts with the functional group (i), and, as necessary, a polyfunctional (meth)acrylate having two or more (meth)acryloyl groups is heated or cured to form a first/second adhesive layer can be mentioned.

According to this method, the functional group (i) in the (meth)acrylate copolymer and the functional group (ii) in the compound react with each other to form a chemical bond, causing curing (crosslinking), whereby an adhesive layer is formed. Therefore, while maintaining the shape-retained state, the photoinitiator can be present in the adhesive layer while keeping its activity.

Incidentally, in this case, as the photoinitiator, any of the cleavage photoinitiators and hydrogen abstraction photoinitiators described above may be used.

As a combination of the functional group (i) and the functional group (ii), for example, a carboxyl group and an epoxy group, a carboxyl group and an aziridinyl group, an amino group and a carboxyl group, a hydroxyl group and an isocyanate group, a carboxyl group and an isocyanate group, an amino group and an isocyanate group, and the like can be mentioned. Among them, a combination of a hydroxyl group and an isocyanate group, an amino group and an isocyanate group, or a carboxyl group and an isocyanate group is particularly preferable.

More specifically, for example, a particularly preferred example is a case where the hydroxyl group-containing monomer (copolymerizable monomer B) described above is used, whereby the (meth)acrylate copolymer has a hydroxyl group, and the compound has an isocyanate group.

In addition, when a photocrosslinker having at least one functional group selected from the group consisting of a hydroxyl group, a carboxyl group, and an amino group as the above photocrosslinker and a compound that reacts with the functional group, such as an isocyanate-based compound, are used, the photocrosslinker reacts with the isocyanate group of the isocyanate-based compound to form a chemical bond and thus is cured (crosslinked), forming an adhesive layer. When an adhesive layer is formed in this manner, the photocrosslinker and the photoinitiator can be present in the adhesive layer while keeping their activities.

In addition, the compound having a functional group (ii) may further have a radically polymerizable functional group such as a (meth)acryloyl group. As a result, an adhesive layer can be formed with the photocurability (crosslinkability) of the (meth)acrylic copolymer due to the radically polymerizable functional group being maintained. More specifically, for example, a particularly preferred example is a case where the hydroxyl group-containing monomer described below is used, whereby the (meta)acrylic ester (co)polymer has a hydroxyl group, and the compound has a (meth)acryloyl group, such as a case where the compound is 2-acryloyloxyethyl isocyanate, 2-methacryloyloxyethyl isocyanate, 1,1-(bisacryloyloxymethynethyl isocyanate, or the like. Like this, when a crosslinking reaction between (meth) acrylic copolymers due to the radically polymerizable functional group is utilized, even without using a polyfunctional (meth)acrylate having two or more (meth)acryloyl groups, the cohesion after photocuring (crosslink) is likely to efficiently increase, resulting in excellent reliability, for example; for such advantages, this is more preferable.

As another specific example of the mode (1), for example, a method in which the hydrogen abstraction initiator described above is utilized as a photoinitiator can be mentioned.

A hydrogen abstraction initiator returns to the ground state even when once excited, and thus can be reused as a photoinitiator. Like this, as a result of utilizing a hydrogen abstraction photoinitiator, even in the case where irradiation with light has been once performed to cause pre-curing and form the adhesive layer, by adjusting the light irradiation dose at the time of pre-curing to adjust the rise in the degree of crosslinking, the photocurability (crosslinkability) due to the photoinitiator can be maintained.

Meanwhile, as a specific example of the mode (2), for example, a method in which a macromonomer is utilized as a monomer component constituting the (meth)acrylic copolymer can be mentioned. More specifically, a method in which a graft copolymer having a macromonomer as a branch component is utilized can be mentioned. As a result of utilizing such a macromonomer, in a room temperature state, branch components attract each other, whereby a state like a physically crosslinked state can be maintained as a resin composition (adhesive), and thus the composition can be retained in sheet shape while remaining uncured (crosslinked). In addition, the photoinitiator can be present in the adhesive layer while keeping its activity.

Incidentally, in this case, as the photoinitiator, any of the cleavage photoinitiators and hydrogen abstraction photoinitiators described above may be used.

<<Preferred Specific Examples of Modes of Present Adhesive Sheet>

As a preferred embodiment of the present adhesive sheet, an embodiment characterized in that the intermediate layer is formed from the resin composition containing a (meth) acrylic copolymer as a main component resin and containing a crosslinker described above, and the intermediate layer has a crosslinked structure, while the first adhesive layer, the second adhesive layer, or both of these layers contain a (meth)acrylic copolymer as a main component resin and are formed from a photocurable resin composition containing a photoinitiator and/or a crosslinker, can be mentioned.

In this case, the crosslinked structure of the intermediate layer may be a crosslinked structure formed by a reaction between the (meth)acrylic copolymer and the crosslinker, a crosslinked structure formed by a reaction between the (meth)acrylic copolymers, a crosslinked structure formed by a reaction between the crosslinkers, or physical crosslinking through the reversible bonding between the (meth)acrylic copolymers due to hydrogen bonding, electrostatic interaction, van der Waals force interaction, or the like. It is preferable that the intermediate layer has one of or two or more of these crosslinked structures.

In addition, in the case where the first adhesive layer, the second adhesive layer, and the intermediate layer each contain a crosslinker, it is preferable that the mass proportion (in each layer) of the crosslinker contained in the first adhesive layer, the second adhesive layer, or both of these layers is higher than the mass proportion (in the intermediate layer) of the crosslinker contained in the intermediate layer.

In the above mode, as described above, it is preferable that the intermediate layer has such a composition that a physically crosslinked structure and/or a chemically crosslinked structure can be formed.

Meanwhile, in the above mode, in the first adhesive layer and/or the second adhesive layer, when a chemical bond is formed in the (meth)acrylic copolymer between at least one functional group selected from the group consisting of a hydroxyl group, a carboxyl group, and an amino group and an isocyanate group, the cohesion of the adhesive layer can be increased; therefore, this is preferable.

In addition, when a (meth)acrylic copolymer composed of a graft copolymer having a macromonomer as a branch component is used as the (meth)acrylic copolymer, shape stability can be obtained; therefore, this is preferable.

In addition, when the first adhesive layer and/or the second adhesive layer is formed from the photocurable resin composition containing a (meth)acrylic copolymer, a photocrosslinker, and a photoinitiator, and the photocrosslinker is a polyfunctional monomer, not only a chemically crosslinked structure is formed as described above, but a physically crosslinked structure can also be formed; therefore, this is preferable in terms of shape stability.

In addition, when the first adhesive layer and/or the second adhesive layer is formed from the photocurable resin composition containing a (meth)acrylic copolymer, a photocrosslinker, and a photoinitiator, and the photocrosslinker has at least one functional group selected from the group consisting of a hydroxyl group, a carboxyl group, and an amino group and is capable of forming a chemical bond between the isocyanate group of the isocyanate-based crosslinker and the functional group, adhesiveness to an adherend can be improved, and the cohesion of the adhesive layer can be improved; therefore, this is preferable.

Further, in the above mode, when the first adhesive layer and/or the second adhesive layer uses a hydrogen abstraction initiator as a photoinitiator, by irradiation with light to cause pre-curing, shape retainability can be enhanced, and, in such a state, the photocurability (crosslinkability) due to the photoinitiator can also be maintained; thus, this is preferable.

<<Thickness>>

It is preferable that the thickness of the present adhesive sheet is within a range of 20 μm to 1 mm, especially 50 μm or more and 600 μm or less, and yet especially particularly preferably 75 μm or more or 500 μm or less.

In the present adhesive sheet, it is preferable that the thickness of the first adhesive layer (X1), the thickness of the second adhesive layer (X2), and the thickness of the intermediate layer (Y) satisfy the relation X1 Y and X2 Y. When the thickness configuration is as above, with the high flowability of the first and second adhesive layers as front and back layers being retained, the high-viscosity intermediate layer secures the cohesion required for the storage and handling of the adhesive sheet. As a result, the sheet can be provided with high levels of step conformability, processability, and shape stability.

From the above point of view, in the case where the thickness of the present adhesive sheet is 20 μm to 1 mm, especially 50 μm or more and 600 μm or less, it is preferable that the thickness of the first adhesive layer (X1) and the thickness of the second adhesive layer (X2) are 50 μm or less, yet especially 5 μm or more and 48 μm or less, and yet especially still more preferably 10 μm or more and 45 μm or less.

Meanwhile, it is preferable that the thickness of the intermediate layer (Y) is 500 μm or less, yet especially 30 μm or more and 490 μm or less, and yet especially still more preferably 40 μm or more and 450 μm or less.

<<Physical Properties of Present Adhesive Sheet>>

The present adhesive sheet is characterized in that it can have the following physical properties.

<Loss Tangent (Tan δ)>

It is preferable that at least one of the first and second adhesive layers has a loss tangent (Tan δ) at a temperature of 90° C. of 0.9 or more, while the intermediate layer has a loss tangent (Tan δ) at a temperature of 90° C. of less than 2.0.

Generally, a polymeric material has both viscous properties and elastic properties. The smaller the Tan δ value, the weaker the viscous properties, making it possible to obtain stiffness, while the greater the Tan δ value, the stronger the viscous properties, making it possible to obtain flowability.

When the intermediate layer has the above loss tangent (Tan δ), the present adhesive sheet can be provided with shape stability, while when at least one of the first and second adhesive layers has the above loss tangent (Tan δ), high flowability can be obtained, and excellent step conformability can be obtained.

From such a point of view, it is preferable that the loss tangent (Tan δ) at a temperature of 90° C. of at least one of the first and second adhesive layers is 0.9 or more, especially 0.95 or more and 3.0 or less, and yet especially still more preferably 1.0 or more and 2.5 or less.

In order for at least one of the first and second adhesive layers to have the above loss tangent (Tan δ), it is necessary that the adhesive layer-forming resin composition is adjusted to form such an adhesive layer. For example, as a main component resin of the adhesive layer-forming resin composition, it is necessary to select and use a (meth)acrylic copolymer, an isobutylene-based polymer, a butadiene- or isoprene-based copolymer, a silicone-based polymer, or a urethane-based polymer. Especially, it is preferable that a (meth)acrylic copolymer is selected, and the composition is prepared to contain a polyfunctional monomer as a crosslinker as necessary, and further contain a photoinitiator as necessary.

From the same point of view, it is preferable that the loss tangent (Tan δ) at a temperature of 90° C. of the intermediate layer is less than 2.0, especially 0.1 or more and 1.8 or less, and yet especially still more preferably 0.2 or more and 1.7 or less.

When the intermediate layer has the above crosslinked structure, the loss tangent (Tan δ) of the intermediate layer can be adjusted within the above range.

Incidentally, in the state where the present adhesive sheet has been photocured, the loss tangent (Tan δ) of at least one of the first and second adhesive layers can be higher than that of the intermediate layer, and this is another characteristic of the present adhesive sheet.

<Viscosity>

It is preferable that the intermediate layer has a viscosity higher than that of the first and/or second adhesive layer in a temperature range of 70° C. to 100° C.

When the intermediate layer has such a viscosity, the flowability of the first and second adhesive layers as front and back layers can be controlled, and the sheet can be provided with high levels of step conformability, processability, and shape stability.

From the above point of view, it is preferable that the viscosity of the intermediate layer in a temperature range of 70° C. to 100° C. is 0.2 to 15 kPa·s, especially more preferably 0.4 kPa·s or more and 10 kPa·s or less.

Meanwhile, it is preferable that the viscosity of the first and/or second adhesive layer in a temperature range of 70° C. to 100° C. is 0.1 to 10 kPa·s, especially more preferably 0.2 kPa·s or more and 5 kPa·s or less.

Incidentally, the viscosity is a value measured in accordance with the method described in the Examples.

Incidentally, in the state where the present adhesive sheet has been photocured, the first and/or second adhesive layer can have a viscosity higher than that of the intermediate layer in a temperature range of 70° C. to 100° C., and this is another characteristic of the present adhesive sheet.

(Light Transmission and Haze)

The present adhesive sheet is used for optical applications, such as use as a constituent member of an image display device. From this point of view, it is preferable that the sheet has a total light transmission (JIS K7361-1) of 80% or more and a haze (JIS K 7136) of 5% or less.

From such a point of view, the total light transmission of the present adhesive sheet is preferably 80% or more, and more preferably 90% or more. In addition, the haze of the present adhesive material is preferably 5% or less, and more preferably 2% or less.

Incidentally, the present adhesive sheet is an adhesive sheet before main curing. Therefore, the above light transmission and haze relate to the light transmission and haze of an adhesive sheet before main curing. Meanwhile, the preferred light transmissions and hazes of an adhesive sheet after main curing are the same as the values before main curing.

(Holding Force Durability)

In the present adhesive sheet, it is preferable that the fall time in the measurement of holding force at 40° C. under a load of 1 N/cm² is 60 minutes or more.

The present adhesive sheet having such physical properties is advantageous in that storage stability and high workability can be obtained.

From the above point of view, especially, the shift length after a lapse of 60 minutes is still more preferably is 10 mm or less, yet especially 5 mm or less, and yet especially more preferably 3 mm or less.

In addition, in the present adhesive sheet, it is preferable that the fall time in the measurement of holding force at 60° C. under a load of 1 N/cm² is less than 60 minutes.

The present adhesive sheet having such physical properties is advantageous in that the sheet has excellent wettability to an adherend and develops high step absorbability, for example. In addition, because of such physical properties, applications to hot-melt attachment are also possible.

In order for the present adhesive sheet to have such physical properties, it is necessary that at least one of the first adhesive layer and the second adhesive layer is formed from a photocurable resin composition. Above all, it is preferable that at least one of the first adhesive layer and the second adhesive layer is prepared to have a loss tangent (Tan δ) at a temperature of 90° C. of 0.9 or more. However, this method is non-limiting.

An example of a means for adjustment to the above holding force is as follows. In the preparation of a photocurable resin composition forming at least one of the first adhesive layer and the second adhesive layer, the kinds and amounts of raw materials that cause the formation of a crosslinked structure, such as a crosslinker and a (meth)acrylate monomer, are adjusted to change the degrees of crosslinking of each layer at 40° C. and 60° C., whereby the holding force can be adjusted. However, the method for holding force adjustment is not limited to such a method.

(Peel Strength)

In the present adhesive sheet, that is, before irradiation with light, it is preferable that the 180° peel strength to glass is 1 N/cm or more, more preferably 2 N/cm or more.

The present adhesive sheet having such physical properties is advantageous in that the present adhesive sheet can be easily positioned when attached to an adherend.

In addition, with respect to the peel strength of the present adhesive sheet after irradiation with light, it is preferable that after the present adhesive sheet is attached to glass and irradiated with light to an accumulated light irradiation dose of 2,000 mJ/m², the 180° peel strength to glass is 3 N/cm or more, more preferably 4 N/cm or more.

The present adhesive sheet having such physical properties has advantages such as high durability. In addition, in order for the present adhesive sheet to have such physical properties, it is necessary to impart photocurability to one or both of the first and second adhesive layers by the method described above.

<<Method for Producing Present Adhesive Sheet>>

An example of a method for producing the present adhesive sheet will be described.

First, a photocurable resin composition for forming a first/second adhesive layer and an intermediate layer-forming resin composition for forming an intermediate layer are each prepared. Specifically, a (meth)acrylic copolymer, as well as a photoinitiator, a crosslinker, a polyfunctional monomer, and other materials as necessary, for example, are mixed each in a predetermined amount, thereby adjusting each resin composition.

The method for mixing in the case is not particularly limited, and the order of mixing the components is not particularly limited either. In addition, the composition production may include a heat treatment step. In this case, it is desirable that the components of the resin composition are previously mixed and then heat-treated.

In addition, it is also possible that each mixing component is concentrated into a masterbatch and used.

The apparatus for mixing is not particularly limited either, and it is possible to use a universal kneader, a planetary mixer, a Banbury mixer, a kneader, a gate mixer, a pressurizing kneader, a three-roll mill, or a two-roll mill, for example. As necessary, a solvent may also be used for mixing.

Incidentally, each resin composition can be used as a solventless system containing no solvent. Use as a solventless system can be advantageous in that no solvent remains, and heat resistance and light resistance are enhanced.

The present adhesive sheet can be prepared by a method in which the adhesive layer-forming resin composition adjusted as described above is applied (by coating) onto a substrate sheet or a release sheet to form a first adhesive layer, then an intermediate layer-forming resin composition is applied (by coating) onto the formed first adhesive layer to form an intermediate layer, and a second adhesive layer is further formed on the formed intermediate layer; a method in which first and second first adhesive layers and an intermediate layer are formed in the same manner as above, and then their application (coating) surfaces are attached together; or a method in which the resin composition is simultaneously formed into a first adhesive layer, an intermediate layer, and a second adhesive layer by multilayer coating or co-extrusion.

The application (coating) method is not particularly limited as long as it is a general coating method. For example, methods such as roll coating, die coating, gravure coating, comma coating, and screen printing can be mentioned. In this case, the resin composition may be heated as necessary before use.

Then, as a method for forming a crosslinked structure in the intermediate layer, in the case where a (meth)acrylic copolymer composed of a graft copolymer having a macromonomer as a branch component is used as the (meth) acrylic copolymer, the main chain and/or graft chain components in the (meth)acrylic copolymer agglomerate with each other due to hydrogen bonding, electrostatic interaction, van der Waals force interaction, or the like, whereby a physically crosslinked structure can be formed in the intermediate layer.

Meanwhile, in order to cause a reaction of a crosslinker, such as a compound having an isocyanate group, it is necessary to perform suitable heating or curing for a certain period, thereby forming a chemically crosslinked structure in the intermediate layer.

In the case where a crosslinker having a protective group, such as a blocked isocyanate, is used as a crosslinker, heating is indispensable for unblocking. As such heating, in the case where layers are formed by co-extrusion or coating as described, heating is preferably performed after co-extrusion or coating. Meanwhile, in the case where films forming the respective layers are attached together, heating may be performed before attachment or may also be performed after attachment.

In addition, in the case where the intermediate layer-forming resin composition contains a photoinitiator, it is also possible to perform irradiation with light to photocure the intermediate layer-forming resin composition forming the intermediate layer, thereby forming a crosslinked structure in the intermediate layer.

In this case, the photocurable resin composition forming the first/second adhesive layer is also photocured. Therefore, as described above, in order for the first/second adhesive layer to have photocurability, in other words, in order for the photoinitiator in the photocurable resin composition to keep its optical activity, it is preferable that the kind of the photopolymerization initiator blended, the wavelength range of the irradiating light, the light dose, the intensity of light, and the like are adjusted such that the adhesive layer has a gel fraction of 0 to 60%, for example.

Specifically, the following method can be mentioned. Using a photoinitiator that initiates a reaction even with light at wavelengths in the visible region (380 nm to 780 nm) as an intermediate layer-forming resin composition, and using a photoinitiator that initiates a reaction only at wavelengths in the ultraviolet region (380 nm or less) as an adhesive layer-forming resin composition, the intermediate layer-forming resin composition and the adhesive layer-forming resin composition are laminated and then irradiated with light consisting of wavelengths in the visible region, thereby making adjustment such that only the photoinitiator of the intermediate layer-forming resin composition is photo-activated to photocure the intermediate layer, and the optical activity of the adhesive layer remains.

However, the first and/or second adhesive layer does not necessarily have to be irradiated with light and pre-cured. For example, the first and/or second adhesive layer may be pre-cured by heat or may also remain uncured.

In addition, it is also possible that the intermediate layer-forming resin composition is previously photocured, and the first/second adhesive layer is laminated on the cured intermediate layer.

<<<Present Adhesive Sheet Laminate>>>

The adhesive sheet laminate according to an example of an embodiment of the present invention (hereinafter also referred to as "present adhesive sheet laminate") is an adhesive sheet laminate including a configuration wherein the present adhesive sheet and a release film are laminated together.

As a material for such a release film, a known release film can be suitably used. For example, it is possible to suitably select and use a polyester film, a polyolefin film, a polycarbonate film, a polystyrene film, an acrylic film, a triacetyl cellulose film, a fluorine resin film, or a like film release-treated by applying thereto a silicone resin, a release paper, or the like.

In the case where a release film is laminated on each side of the present adhesive sheet, one release film and the other release film may be of the same laminated configuration and/or material or of different laminated configurations and/or materials.

In addition, one release film and the other release film may be of the same thickness or different thicknesses.

In addition, release films of different peeling forces or different thicknesses can be laminated on the respective sides of the present adhesive sheet.

The thickness of the release film is not particularly limited. Especially, for example, in terms of processability and handleability, the thickness is preferably 25 µm to 500 µm, yet especially 38 µm or more or 250 µm or less, and yet especially still more preferably 50 µm or more or 200 µm or less.

Incidentally, the present adhesive sheet can also employ a method that does not use an adherend member or a release film as above, such as a method in which the resin composition is directly extruded or injection-molded.

Further, it is also possible that a space between constituent members for an image display device, which are adherend members, is directly filled with the resin composition, thereby forming a mode of the present adhesive sheet.

<<<Present Laminate for Image Display Device>>>

The laminate for an image display device according to an example of an embodiment of the present invention (referred to as "present laminate for an image display device") is a laminate for an image display device, including a configuration wherein the present adhesive sheet is interposed between two constituent members for an image display device.

As the image display device constituent members, for example, a combination of two or more kinds selected from the group consisting of a touch sensor, an image display panel, a surface protection panel, a polarizing film, and a phase difference film can be mentioned.

As specific examples of the present laminate for an image display device, configurations such as release film/present adhesive sheet/touch panel, image display panel/present adhesive sheet/touch panel, image display panel/present adhesive sheet/touch panel/present adhesive sheet/protection panel, polarizing film/present adhesive sheet/touch panel, and polarizing film/present adhesive sheet/touch panel/present adhesive sheet/protection panel can be mentioned.

The touch panel described above may also be a structure in which a touch panel function is internalized in a protection panel or a structure in which a touch panel function is internalized in an image display panel.

Therefore, the present laminate may also be, for example, a configuration such as release film/present adhesive sheet/protection panel, release film/present adhesive sheet/image display panel, or image display panel/present adhesive sheet/protection panel.

In addition, in the above configurations, an electrically conductive layer may be interposed between the present adhesive sheet and a member adjacent thereto, such as a touch panel, a protection panel, an image display panel, or a polarizing film; all such configurations can be mentioned. However, these lamination examples are non-limiting.

Incidentally, as the touch panel, resistive, capacitive, inductive, and like touch panels can be mentioned. Especially, capacitive touch panels are preferable.

The material for the protection panel may be glass or may also be a plastic such as an acrylic resin, a polycarbonate-based resin, an alicyclic polyolefin-based resin such as a cycloolefin-based polymer, a styrene-based resin, a polyvinyl chloride-based resin, a phenol-based resin, a melamine-based resin, or an epoxy-based resin.

An image display panel is formed of a polarizing film or other optical films such as a phase difference film, a liquid crystal material, and a backlight system (usually, the surface of an adhesive layer-forming resin composition or an adhesive article adhering to an image display panel serves as an optical film). Depending on the mode for controlling the liquid crystal material, there exist STN mode, VA mode, IPS mode, and the like, and any mode may be used.

The present laminate for an image display device can be used as a constituent member of an image display device, such as a liquid crystal display, an organic EL display, an inorganic EL display, electronic paper, a plasma display, or a micro-electromechanical system (MEMS) display.

<<<Present Image Display Device>>>

The image display device according to an example of an embodiment of the present invention (referred to "present image display device") includes the present laminate for an image display device.

Specific examples of the present image display device include liquid crystal displays, organic EL displays, inorganic EL displays, electronic paper, plasma displays, and micro-electromechanical system (MEMS) displays including the present laminate for an image display device.

<<<Description of Terms>>>

As used herein, unless otherwise noted, the expression "X to Y" (X and Y are each an arbitrary number) means "X or more and Y or less", and also means "preferably more than X" or "preferably less than Y".

In addition, the expressions "X or more" (X is an arbitrary number) and "Y or less" (Y is an arbitrary number) also mean "preferably more than X" and "preferably less than Y", respectively.

In the present invention, the term "film" also encompasses "sheet", and the term "sheet" also encompasses "film".

EXAMPLES

Hereinafter, the present invention will be described in further detail through examples and comparative examples. However, the present invention is not limited to these examples.

<<<Adjustment of Layer-Forming Materials>>>

(Intermediate Layer-Forming Resin Composition 1)

As a (meth)acrylic copolymer, to 1 kg of an acrylic graft copolymer (A-1, mass average molecular weight: 250,000) obtained by the random copolymerization of 14.8 parts by mass of a macromonomer composed of isobornyl methacrylate:methyl methacrylate=1:1 and having a methacryloyl group as a terminal functional group (number average molecular weight: 3,000), 73.3 parts by mass of 2-ethylhexyl acrylate, 8.8 parts by mass of methyl acrylate, and 3.1 parts by mass of acrylamide, 20 g of pentaerythritol polyacrylate ("A-TMM3-L" manufactured by Shin-Nakamura Chemical Co., Ltd.) as a polyfunctional monomer and 15 g of a mixture of 2,4,6-trimethylbenzoyl-diphenyl-phosphine oxide, oligo (2-hydroxy-2-methyl-1-(4-(1-methylvinyl)phenyl)propanone), 2,4,6-trimethyl benzophenone, and 4-methyl benzophenone ("Esacure KT046" manufactured by IGM) as a photopolymerization initiator were added and uniformly mixed to give an intermediate layer-forming resin composition 1.

<Intermediate Layer Sheet Laminate 1>

Next, the intermediate layer-forming resin composition 1 was formed into a sheet shape on a polyethylene terephthalate film having a release-treated surface ("DIAFOIL MRV (V03)" manufactured by Mitsubishi Chemical Corporation, 100 μm thick) to a thickness of 210 μm, and then covered with a polyethylene terephthalate film having a release-treated surface ("DIAFOIL MRQ" manufactured by Mitsubishi Chemical Corporation, 75 μm thick), thereby preparing an intermediate layer sheet laminate 1.

Incidentally, the intermediate layer sheet laminate 1 was an adhesive sheet having a physically crosslinked structure formed by the physical agglomeration of the macromonomer component composed of isobornyl methacrylate:methyl methacrylate=1:1 and having a methacryloyl group as a terminal functional group contained in the (meth)acrylic copolymer (A-1), and further was an adhesive sheet having photocurability, that is, crosslinkable by irradiation with light.

<Intermediate Layer Sheet Laminate 2>

In addition, the intermediate layer-forming resin composition 1 was formed into a sheet shape on a polyethylene terephthalate film having a release-treated surface ("DIAFOIL MRV (V03)" manufactured by Mitsubishi Chemical Corporation, 100 μm thick) to a thickness of 100 μm, and then covered with a polyethylene terephthalate film having a release-treated surface ("DIAFOIL MRQ" manufactured by Mitsubishi Chemical Corporation, 75 μm thick), thereby preparing an intermediate layer sheet laminate 2.

Incidentally, similarly to the intermediate layer sheet laminate 1, the intermediate layer sheet laminate 2 was also an adhesive sheet having a physically crosslinked structure formed by the (meth)acrylic copolymer (A-1), and further was an adhesive sheet having photocurability, that is, crosslinkable by irradiation with light.

<Intermediate Layer Sheet Laminate 3>

In addition, the intermediate layer-forming resin composition 1 was formed into a sheet shape on a polyethylene terephthalate film having a release-treated surface ("DIAFOIL MRV (V03)" manufactured by Mitsubishi Chemical Corporation, 100 μm thick) to a thickness of 210 μm, and then covered with a polyethylene terephthalate film having a release-treated surface ("DIAFOIL MRQ" manufactured by Mitsubishi Chemical Corporation, 75 μm thick).

Using a high-pressure mercury lamp through a UV cut filter, light irradiation was performed to an accumulated light dose of 3,000 mJ/cm$^2$ at 405 nm to photocure the intermediate layer-forming resin composition 1, thereby preparing an intermediate layer sheet laminate 3.

The intermediate layer sheet laminate 3 was an adhesive sheet having a chemically crosslinked structure formed by photocrosslinking and a physically crosslinked structure formed by the physical agglomeration of the macromonomer component contained in the acrylic copolymer (A-1).

(Intermediate Layer-Forming Resin Composition 2)

An intermediate layer-forming resin composition 2 was prepared in the same manner as in (Intermediate Layer-Forming Resin Composition 1), except for using, as a (meth)acrylic copolymer, in place of (A-1), an acrylic graft copolymer (A-2, mass average molecular weight: 160,000) obtained by the random copolymerization of 13.5 parts by mass of a macromonomer composed of isobornyl methacrylate:methyl methacrylate=1:1 and having a methacryloyl group as a terminal functional group (number average molecular weight: 3,000), 43.7 parts by mass of lauryl acrylate, 40 parts by mass of 2-ethylhexyl acrylate, and 2.8 parts by mass of acrylamide.

<Intermediate Layer Sheet Laminate 4>

Subsequently, an intermediate layer sheet laminate 4 was prepared in the same manner as for the intermediate layer sheet laminate 2.

Incidentally, the intermediate layer sheet laminate 4 was an adhesive sheet having a physically crosslinked structure formed by the physical agglomeration of the macromonomer component composed of isobornyl methacrylate:methyl methacrylate=1:1 and having a methacryloyl group as a terminal functional group contained in the (meth)acrylic copolymer (A-2), and further was an adhesive sheet having photocurability, that is, crosslinkable by irradiation with light.

(Intermediate Layer-Forming Resin Composition 3)

As a (meth)acrylic copolymer, to 1 kg of an acrylic graft copolymer (A-2, mass average molecular weight: 160,000)

obtained by the random copolymerization of 13.5 parts by mass of a macromonomer composed of isobornyl methacrylate:methyl methacrylate=1:1 and having a methacryloyl group as a terminal functional group (number average molecular weight: 3,000), 43.7 parts by mass of lauryl acrylate, 40 parts by mass of 2-ethylhexyl acrylate, and 2.8 parts by mass of acrylamide, 20 g of a blocked isocyanate compound ("MF-B60B" manufactured by Asahi Kasei Corporation) as a thermal crosslinker, 30 g of pentaerythritol polyacrylate ("A-TMM3-L" manufactured by Shin-Nakamura Chemical Co., Ltd.) as a polyfunctional monomer, and 20 g of a mixture of 2,4,6-trimethylbenzoyl-diphenyl-phosphine oxide, oligo(2-hydroxy-2-methyl-1-(4-(1-methylvinyl)phenyl)propanone), 2,4,6-trimethyl benzophenone, and 4-methyl benzophenone ("Esacure KT046" manufactured by IGM) as a photoinitiator were added and uniformly mixed to give an intermediate layer-forming resin composition 3.

<Intermediate Layer Sheet Laminate 5>

Next, the intermediate layer-forming resin composition 3 was formed into a sheet shape on a polyethylene terephthalate film having a release-treated surface ("DIAFOIL MRV (V03)" manufactured by Mitsubishi Chemical Corporation, 100 μm thick) to a thickness of 100 μm, then covered with a polyethylene terephthalate film having a release-treated surface ("DIAFOIL MRQ" manufactured by Mitsubishi Chemical Corporation, 75 μm thick), heated at 120° C. for 30 minutes, and then cured at room temperature for one week to crosslink the thermal crosslinker, thereby preparing an intermediate layer sheet laminate 5.

Incidentally, the intermediate layer sheet laminate 5 was an adhesive sheet having a chemically crosslinked structure formed by the thermal crosslinker and a physically crosslinked structure formed by the physical agglomeration of the macromonomer component contained in the acrylic copolymer (A-2), and further was an adhesive sheet having photocurability, that is, crosslinkable by irradiation with light.

(Intermediate Layer-Forming Resin Composition 4)

As a (meth)acrylic copolymer, to 1 kg of an acrylic graft copolymer (A-3, mass average molecular weight: 440,000) obtained by the random copolymerization of 64 parts by mass of 2-ethylhexyl acrylate, 19 parts by mass of methyl acrylate, and 17 parts by mass of hydroxyethyl acrylate, 20 g of a blocked isocyanate compound ("MF-B60B" manufactured by Asahi Kasei Corporation) as a thermal crosslinker was added and uniformly mixed to give an intermediate layer-forming resin composition 4.

<Intermediate Layer Sheet Laminate 6>

Next, the intermediate layer-forming resin composition 4 was formed into a sheet shape on a polyethylene terephthalate film having a release-treated surface ("DIAFOIL MRV (V03)" manufactured by Mitsubishi Chemical Corporation, 100 μm thick) to a thickness of 80 μm, then covered with a polyethylene terephthalate film having a release-treated surface ("DIAFOIL MRQ" manufactured by Mitsubishi Chemical Corporation, 75 μm thick), heated at 120° C. for 30 minutes, and then cured at room temperature for one week to crosslink the thermal crosslinker, thereby preparing an intermediate layer sheet laminate 6.

Incidentally, the intermediate layer sheet laminate 6 was an adhesive sheet having a chemically crosslinked structure formed by the thermal crosslinker.

(Intermediate Layer-Forming Resin Composition 5)

As a (meth)acrylic copolymer, to 1 kg of an acrylic graft copolymer (A-3, mass average molecular weight: 440,000) obtained by the random copolymerization of 64 parts by mass of 2-ethylhexyl acrylate, 19 parts by mass of methyl acrylate, and 17 parts by mass of hydroxyethyl acrylate, 20 g of a blocked isocyanate compound ("MF-B60B" manufactured by Asahi Kasei Corporation) as a thermal crosslinker and 20 g of a mixture of 4-methyl benzophenone and 2,4,6-trimethyl benzophenone ("Esacure TZT" manufactured by IGM) as a photoinitiator were added and uniformly mixed to give an intermediate layer-forming resin composition 5.

<Intermediate Layer Sheet Laminate 7>

Next, the intermediate layer-forming resin composition 5 was formed into a sheet shape on a polyethylene terephthalate film having a release-treated surface ("DIAFOIL MRV (V03)" manufactured by Mitsubishi Chemical Corporation, 100 μm thick) to a thickness of 80 μm, then covered with a polyethylene terephthalate film having a release-treated surface ("DIAFOIL MRQ" manufactured by Mitsubishi Chemical Corporation, 75 μm thick), heated at 120° C. for 30 minutes, and then cured at room temperature for one week to crosslink the thermal crosslinker, thereby preparing an intermediate layer sheet laminate 7.

Incidentally, the intermediate layer sheet laminate 7 was an adhesive sheet having a chemically crosslinked structure formed by the thermal crosslinker, and further was an adhesive sheet having photocurability, that is, crosslinkable by irradiation with light.

(Intermediate Layer-Forming Resin Composition 6)

As a (meth)acrylic copolymer (A), to 1 kg of an acrylic graft copolymer (A-4, mass average molecular weight: 250,000) obtained by the random copolymerization of 15 parts by mass of a macromonomer composed of methyl methacrylate and having a methacryloyl group as a terminal functional group (number average molecular weight: 3,000), 86 parts by mass of butyl acrylate, and 4 parts by mass of acrylic acid, 40 g of a blocked isocyanate compound ("MF-B60B" manufactured by Asahi Kasei Corporation) as a thermal crosslinker was added and uniformly mixed to give an intermediate layer-forming resin composition 6.

<Intermediate Layer Sheet Laminate 8>

Next, the intermediate layer-forming resin composition 6 was formed into a sheet shape on a polyethylene terephthalate film having a release-treated surface ("DIAFOIL MRV (V03)" manufactured by Mitsubishi Chemical Corporation, 100 μm thick) to a thickness of 70 μm, then covered with a polyethylene terephthalate film having a release-treated surface ("DIAFOIL MRQ" manufactured by Mitsubishi Chemical Corporation, 75 μm thick), heated at 120° C. for 30 minutes, and then cured at room temperature for one week to crosslink the thermal crosslinker, thereby preparing an intermediate layer sheet laminate 8.

Incidentally, the intermediate layer sheet laminate 8 was an adhesive sheet having a chemically crosslinked structure formed by the thermal crosslinker and a physically crosslinked structure formed by the physical agglomeration of the macromonomer component contained in the acrylic copolymer (A-4).

TABLE 1

| | | Intermediate layer-forming resin composition | | | | | |
|---|---|---|---|---|---|---|---|
| | | 1 | 2 | 3 | 4 | 5 | 6 |
| (Meth)acrylic copolymer | A-1 | 100 | | | | | |
| | A-2 | | 100 | 100 | | | |
| | A-3 | | | | 100 | 100 | |
| | A-4 | | | | | | 100 |

TABLE 1-continued

| Crosslinker | PETA | 2 | 2 | 3 | | | | |
|---|---|---|---|---|---|---|---|---|
| | MF-B60B | | | | 2 | 2 | 2 | 4 |
| Photoinitiator | KTO46 | 1.5 | 1.5 | | | | | |
| | TZT | | | 2 | | 2 | | |

| | Intermediate layer sheet laminate | | | | | | | |
|---|---|---|---|---|---|---|---|---|
| | 1 | 2 | 3 | 4 | 5 | 6 | 7 | 8 |
| Intermediate layer thickness (μm) | 210 | 100 | 210 | 100 | 100 | 80 | 80 | 70 |

(Adhesive Layer-Forming Resin Composition 1)

As a (meth)acrylic copolymer, to 1 kg of an acrylic graft copolymer (X-1, mass average molecular weight: 250,000) obtained by the random copolymerization of 14.8 parts by mass of a macromonomer composed of isobornyl methacrylate:methyl methacrylate=1:1 and having a methacryloyl group as a terminal functional group (number average molecular weight: 3,000), 73.3 parts by mass of 2-ethylhexyl acrylate, 8.8 parts by mass of methyl acrylate, and 3.1 parts by mass of acrylamide, 125 g of dipentaerythritol polyacrylate ("A9570W" manufactured by Shin-Nakamura Chemical Co., Ltd.) and 25 g of pentaerythritol tri- and tetraacrylate (A-TMM3-L manufactured by Shin-Nakamura Chemical Co., Ltd.) as polyfunctional monomers, 20 g of a mixture of 2,4,6-trimethylbenzoyl-diphenyl-phosphine oxide, oligo(2-hydroxy-2-methyl-1-(4-(1-methylvinyl)phenyl)propanone), 2,4,6-trimethyl benzophenone, and 4-methyl benzophenone (Esacure KT046 manufactured by IGM) as a photoinitiator were added and uniformly mixed to give an adhesive layer-forming resin composition 1.

<Adhesive Sheet Laminate 1>

Next, the adhesive layer-forming resin composition 1 was formed into a sheet shape on a polyethylene terephthalate film having a release-treated surface ("DIAFOIL MRV (V08)" manufactured by Mitsubishi Chemical Corporation, 100 μm thick) to a thickness of 20 μm, and then covered with a polyethylene terephthalate film having a release-treated surface ("DIAFOIL MRQ" manufactured by Mitsubishi Chemical Corporation, 75 μm thick), thereby preparing an adhesive layer sheet laminate 1.

<Adhesive Sheet Laminate 1'>

Further, the adhesive layer-forming resin composition 1 was formed into a sheet shape on a polyethylene terephthalate film having a release-treated surface ("DIAFOIL MRV (V03)" manufactured by Mitsubishi Chemical Corporation, 75 μm thick) to a thickness of 20 μm, and then covered with a polyethylene terephthalate film having a release-treated surface ("DIAFOIL MRQ" manufactured by Mitsubishi Chemical Corporation, 75 μm thick), thereby preparing an adhesive layer sheet laminate 1'.

<Adhesive Sheet Laminate 2>

In addition, the adhesive layer-forming resin composition 1 was formed into a sheet shape on a polyethylene terephthalate film having a release-treated surface ("DIAFOIL MRV (V08)" manufactured by Mitsubishi Chemical Corporation, 100 μm thick) to a thickness of 40 μm, and then covered with a polyethylene terephthalate film having a release-treated surface (DIAFOIL MRQ manufactured by Mitsubishi Chemical Corporation, 75 μm thick), thereby preparing an adhesive layer sheet laminate 2.

<Adhesive Sheet Laminate 2'>

Further, the adhesive layer-forming resin composition 1 was formed into a sheet shape on a polyethylene terephthalate film having a release-treated surface ("DIAFOIL MRV (V03)" manufactured by Mitsubishi Chemical Corporation, 75 μm thick) to a thickness of 40 μm, and then covered with a polyethylene terephthalate film having a release-treated surface (DIAFOIL MRQ manufactured by Mitsubishi Chemical Corporation, 75 μm thick), thereby preparing an adhesive layer sheet laminate 2'.

(Adhesive Layer-Forming Resin Composition 2)

As a (meth)acrylic copolymer, to 1 kg of an acrylic graft copolymer (X-2, mass average molecular weight: 160,000) obtained by the random copolymerization of 13.5 parts by mass of a macromonomer composed of isobornyl methacrylate:methyl methacrylate=1:1 and having a methacryloyl group as a terminal functional group (number average molecular weight: 3,000), 43.7 parts by mass of lauryl acrylate, 40 parts by mass of 2-ethylhexyl acrylate, and 2.8 parts by mass of acrylamide, 80 g of caprolactone-modified isocyanuric acid triacrylate ("A9300-1CL" manufactured by Shin-Nakamura Chemical Co., Ltd.) as a polyfunctional monomer and 20 g of a mixture of 2,4,6-trimethylbenzoyl-diphenyl-phosphine oxide, oligo(2-hydroxy-2-methyl-1-(4-(1-methylvinyl)phenyl)propanone), 2,4,6-trimethyl benzophenone, and 4-methyl benzophenone ("Esacure KT046" manufactured by IGM) as a photoinitiator were added and uniformly mixed to give an adhesive layer-forming resin composition 2.

<Adhesive Sheet Laminate 3>

Next, the adhesive layer-forming resin composition 2 was formed into a sheet shape on a polyethylene terephthalate film having a release-treated surface ("DIAFOIL MRV (V08)" manufactured by Mitsubishi Chemical Corporation, 100 μm thick) to a thickness of 40 μm, and then covered with a polyethylene terephthalate film having a release-treated surface ("DIAFOIL MRQ" manufactured by Mitsubishi Chemical Corporation, 75 μm thick), thereby preparing an adhesive layer sheet laminate 3.

<Adhesive Sheet Laminate 3'>

Further, the adhesive layer-forming resin composition 2 was formed into a sheet shape on a polyethylene terephthalate film having a release-treated surface ("DIAFOIL MRV (V03)" manufactured by Mitsubishi Chemical Corporation, 75 μm thick) to a thickness of 40 μm, and then covered with a polyethylene terephthalate film having a release-treated surface ("DIAFOIL MRQ" manufactured by Mitsubishi Chemical Corporation, 75 μm thick), thereby preparing an adhesive layer sheet laminate 3'.

(Adhesive Layer-Forming Resin Composition 3)

As a (meth)acrylic copolymer, to 1 kg of an acrylic graft copolymer (X-3, mass average molecular weight: 250,000) obtained by the random copolymerization of 15 parts by mass of a macromonomer composed of methyl methacrylate and having a methacryloyl group as a terminal functional group (number average molecular weight: 3,000), 86 parts by mass of butyl acrylate, and 4 parts by mass of acrylic acid, 150 g of propoxylated pentaerythritol triacrylate ("NK Ester ATM-4PL" manufactured by Shin-Nakamura Chemical Co., Ltd.) as a polyfunctional monomer and 15 g of a mixture of 2,4,6-trimethyl benzophenone and 4-methyl benzophenone ("Esacure TZT" manufactured by IGM) as a photoinitiator were added and uniformly mixed to give an adhesive layer-forming resin composition 3.

<Adhesive Sheet Laminate 4>

Next, the adhesive layer-forming resin composition 3 was formed into a sheet shape on a polyethylene terephthalate film having a release-treated surface ("DIAFOIL MRV (V08)" manufactured by Mitsubishi Chemical Corporation, 100 μm thick) to a thickness of 40 μm, and then covered with a polyethylene terephthalate film having a release-treated surface ("DIAFOIL MRQ" manufactured by Mitsubishi Chemical Corporation, 75 μm thick), thereby preparing an adhesive layer sheet laminate 4.

<Adhesive Sheet Laminate 4'>

Further, the adhesive layer-forming resin composition 3 was formed into a sheet shape on a polyethylene terephthalate film having a release-treated surface ("DIAFOIL MRV (V03)" manufactured by Mitsubishi Chemical Corporation, 75 μm thick) to a thickness of 40 μm, and then covered with a polyethylene terephthalate film having a release-treated surface ("DIAFOIL MRQ" manufactured by Mitsubishi Chemical Corporation, 75 μm thick), thereby preparing an adhesive layer sheet laminate 4'.

TABLE 2

|  |  |  | Adhesive layer-forming resin composition | | |
|---|---|---|---|---|---|
|  |  |  | 1 | 2 | 3 |
| (Meth) acrylic copolymer | X-1 |  | 100 |  |  |
|  | X-2 |  |  | 100 |  |
|  | X-3 |  |  |  | 100 |
| Crosslinker | Y-1 | PETA | 2.5 |  | 3 |
|  |  | DPHA | 12.5 |  |  |
|  | Y-2 |  |  | 8 |  |
|  | Y-3 |  |  |  | 15 |
| Photoinitiator | Z-1 |  | 2 | 2 |  |
|  | Z-2 |  |  |  | 1.5 |

|  | Adhesive layer sheet laminate | | | |
|---|---|---|---|---|
|  | 1, 1' | 2, 2' | 3, 3' | 4, 4' |
| Adhesive layer thickness (μm) | 20 | 40 | 40 | 50 |

Example 1

The release film on one surface of the intermediate layer sheet laminate 1 ("DIAFOIL MRQ" manufactured by Mitsubishi Chemical Corporation, 75 μm thick) was peeled off. The release film of the adhesive layer sheet laminate 1 ("DIAFOIL MRQ" manufactured by Mitsubishi Chemical Corporation, 75 μm thick) was peeled off, and the exposed adhesive surface was attached to the exposed intermediate layer-forming resin composition surface of the intermediate layer sheet laminate 1 using a hand roller.

Next, the release film on the other surface of the intermediate layer sheet laminate 1 ("DIAFOIL MRV (V03)" manufactured by Mitsubishi Chemical Corporation, 100 μm thick) was peeled off. The release film of the adhesive sheet laminate 1' (DIAFOIL MRQ manufactured by Mitsubishi Chemical Corporation, 75 μm thick) was peeled off, and the exposed adhesive surface was attached to the exposed intermediate layer-forming resin composition surface of the intermediate layer sheet laminate 1 using a hand roller.

Then, an autoclave treatment was performed under the conditions of a temperature of 60° C., 0.2 MPa, and 20 minutes, thereby preparing an adhesive sheet laminate 1 (250 μm thick) having the following layer configuration: adhesive layer (adhesive layer-forming resin composition 1)/intermediate layer (intermediate layer-forming resin composition 1)/adhesive layer (adhesive layer-forming resin composition 1)=20 μm/210 μm/20 μm.

Examples 2 to 8 adhesive sheet laminates 2 to 8 were obtained in the same manner as in Example 1, except that the intermediate layer sheet laminate and adhesive layer sheet laminate used were changed as in [Table 3].

TABLE 3

|  | Examples | | | | | | | |
|---|---|---|---|---|---|---|---|---|
|  | 1 | 2 | 3 | 4 | 5 | 6 | 7 | 8 |
| Adhesive sheet laminate | 1 | 2 | 3 | 4 | 5 | 6 | 7 | 8 |
| Intermediate layer sheet laminate | 1 | 4 | 5 | 6 | 7 | 2 | 8 | 3 |
| Intermediate layer thickness (μm) | 210 | 100 | 100 | 100 | 80 | 100 | 70 | 210 |

TABLE 3-continued

|  | Examples | | | | | | | |
|---|---|---|---|---|---|---|---|---|
|  | 1 | 2 | 3 | 4 | 5 | 6 | 7 | 8 |
| Adhesive layer sheet laminate | 1, 1' | 2, 2' | 4, 4' | 2, 2' | 2, 2' | 3, 3' | 2, 2' | 1, 1' |
| Adhesive layer thickness (μm) | 20 | 40 | 50 | 40 | 40 | 40 | 40 | 20 |
| Adhesive sheet total thickness (μm) | 250 | 180 | 200 | 180 | 160 | 180 | 150 | 250 |

Comparative Example 1

The adhesive layer-forming resin composition 1 was formed into a sheet shape on a polyethylene terephthalate film having a release-treated surface ("DIAFOIL MRV (V08)" manufactured by Mitsubishi Chemical Corporation, 100 μm thick) to a thickness of 180 μm, and then covered with a polyethylene terephthalate film having a release-treated surface ("DIAFOIL MRQ" manufactured by Mitsubishi Chemical Corporation, 75 μm thick), thereby preparing an adhesive sheet laminate 9 (180 μm thick) formed only of an adhesive layer having hot-meltability and a loss tangent (Tan δ) at a temperature of 90° C. of 0.9 or more.

Comparative Example 2

Using a COP film ("ZF90" manufactured by Zeon Corporation, 100 μm thick) as an intermediate layer, the release film of the adhesive layer sheet laminate 1 ("DIAFOIL MRQ" manufactured by Mitsubishi Chemical Corporation, 75 µm thick) was peeled off, and the exposed adhesive surface was attached to one surface of the COP film using a hand roller.

Next, the release film of the adhesive sheet laminate 1' ("DIAFOIL MRQ" manufactured by Mitsubishi Chemical Corporation, 75 µm thick) was peeled off, and the exposed adhesive surface was attached to the other surface of the COP film using a hand roller. An autoclave treatment was performed under the conditions of a temperature of 60° C., 0.2 MPa, and 20 minutes, thereby preparing an adhesive sheet laminate 10 (140 µm thick) having the following layer configuration: adhesive layer-forming resin composition 1/COP film/adhesive layer-forming resin composition 1'=20 µm/100 µm/20 µm.

Comparative Example 3

An acrylic adhesive ("SK Dyne 1882" manufactured by Soken Chemical & Engineering Co., Ltd.; the addition rate of the curing agent was the recommended rate) was formed into a sheet shape on a polyethylene terephthalate film having a release-treated surface ("DIAFOIL MRV (V08)" manufactured by Mitsubishi Chemical Corporation, 100 µm thick) to a thickness of 30 µm, thereby forming an adhesive layer. Six such adhesive layers were stacked using a hand roller and then covered with a polyethylene terephthalate film having a release-treated surface ("DIAFOIL MRQ" manufactured by Mitsubishi Chemical Corporation, 75 µm thick).

An autoclave treatment was performed under the conditions of a temperature of 60° C., 0.2 MPa, and 20 minutes, followed by curing at ordinary temperature for one week, and then an adhesive sheet laminate 11 (180 µm thick) was formed.

The adhesive layers of the adhesive sheet laminate 11 were each formed of an adhesive sheet having a chemically crosslinked structure formed by the thermal crosslinker, having a loss tangent (Tan δ) at a temperature of 90° C. of less than 0.9, and having no hot-meltability.

Comparative Example 4

To 1 kg of an acrylic copolymer (mass average molecular weight: 490,000) obtained by the random copolymerization of 72 parts by mass of butyl acrylate, 26 parts by mass of 2-ethylhexyl acrylate, and 2 parts by mass of acrylic acid, 60 g of nonanediol diacrylate ("BISCOAT 260" manufactured by Osaka Organic Chemical Industry Ltd.) as a polyfunctional monomer and 10 g of a mixture of 2,4,6-trimethyl benzophenone and 4-methyl benzophenone (Esacure TZT manufactured by IGM) as a photoinitiator were added and uniformly mixed to give an adhesive layer-forming resin composition 4.

Next, the adhesive layer-forming resin composition 4 was formed into a sheet shape on a polyethylene terephthalate film having a release-treated surface ("DIAFOIL MRV (V08)" manufactured by Mitsubishi Chemical Corporation, 100 µm thick) to a thickness of 200 µm, and then covered with a polyethylene terephthalate film having a release-treated surface ("DIAFOIL MRQ" manufactured by Mitsubishi Chemical Corporation, 75 µm thick).

Using a high-pressure mercury lamp, the adhesive sheet was irradiated with light through a release film to an accumulated light dose of 2,000 mJ/cm² at a wavelength of 365 nm, thereby preparing an adhesive sheet laminate 12.

This adhesive sheet was an adhesive sheet having a physically crosslinked structure formed using the polyfunctional monomer, having no hot-meltability, and having a loss tangent (Tan δ) at a temperature of 90° C. of less than 0.9.

TABLE 4

|  | Comparative Examples | | | |
|---|---|---|---|---|
|  | 1 | 2 | 3 | 4 |
| Adhesive sheet laminate | 9 | 10 | 11 | 12 |
| Intermediate layer-forming resin composition | — | COP | — | — |
| Intermediate layer thickness (µm) | — | 100 | — | — |
| Adhesive layer-forming resin composition | 1 | 1 | Acrylic adhesive | 4 |
| Adhesive layer thickness (µm) | 180 | 20 | 180 | 200 |
| Adhesive sheet total thickness (µm) | 180 | 140 | 180 | 200 |
| Laminate configuration | Monolayer | Laminated | Monolayer | Monolayer |

<Evaluation>

The sheets, etc., obtained in the examples and the comparative examples were each evaluated as follows. The evaluation results are shown in Table 5.

(1) Viscosity Measurement

With respect to the intermediate layer sheet laminates 1 to 8, the adhesive layer sheet laminates 1 to 4, and the adhesive sheet laminates of Comparative Example 3 and Comparative Example 4, the release film was peeled off, and an adhesive sheet was stacked to make the thickness 1 mm or more. Next, using a rheometer ("MARS" manufactured by EKO Instruments Co., Ltd.), dynamic viscoelasticity was measured under the following conditions: adhesive jig: ϕ 20 mm parallel plate, strain: 0.5%, frequency: 1 Hz, temperature rise rate: 3° C./min.

In addition, with respect to the intermediate layer-forming resin compositions and adhesive layer-forming resin compositions used in the examples and the comparative examples, viscosity was measured at 40° C., 70° C., and 100° C.

(2) Holding Force

With respect to the adhesive sheet laminates 1 to 12 prepared in the examples and the comparative examples, one release film was peeled off, and, as a backing film, a polyethylene terephthalate film ("DIAFOIL S-100" manufactured by Mitsubishi Chemical Corporation, 38 µm thick) was roll-pressed and bonded using a hand roller.

This laminate was cut into a strip shape 25 mm in width×150 mm in length. The remaining release film was peeled off, and the exposed adhesive surface was roll-pressed and bonded to a stainless steel (SUS) plate using a hand roller, thereby preparing a sample for holding force measurement. The area of attachment to the SUS plate was 25 mm×20 mm.

The sample was vertically hung in a thermostat set at 40° C. and cured for 15 minutes, and then a weight of 5 N was applied to the sample. As a result, the load applied to the adhesive sheet is 1 N/cm². Then, with respect to the sample after a lapse of 60 minutes from weight application, the time (min) to fall from the SUS plate was measured, and defined as a 40° C. holding force. In the case where the sample did not fall in 60 minutes, the distance the sample shifted (shift length) (mm) was measured.

Further, a sample for holding force measurement prepared in the same manner as above was vertically hung in a thermostat set at 60° C. and cured for 15 minutes, and then a weight of 5 N was applied to the sample. The time (min) until the sample fell from the stainless steel plate was measured, and defined as a 60° C. holding force. In the case where the sample did not fall in 60 minutes, the distance the sample shifted (shift length) (mm) was measured.

(3) Optical Characteristics

With respect to the adhesive sheet laminates 1 to 12 prepared in the examples and the comparative examples, one release film was peeled off, and soda lime glass of 82 mm×53 mm, 0.55 mm thick, was attached to the exposed adhesive surface using a hand roller.

The remaining release film was peeled off, and soda lime glass of 82 mm×53 mm, 0.55 mm thick, was attached to the exposed adhesive surface using a hand roller.

The adhesive sheet laminates 1 to 10 were autoclaved under conditions of 60° C., 0.2 MPa, and 20 min, and then, from one glass surface, irradiated with light using a high-pressure mercury lamp such that light at a wavelength of 365 nm reached the adhesive sheet laminate to an accumulated light dose of 2,000 mJ/cm$^2$, thereby preparing samples for optical characteristic evaluation.

The adhesive sheet laminates 11 and 12 were autoclaved under conditions of 60° C., 0.2 MPa, and 20 min and thus obtained as samples for optical characteristic evaluation.

Using a haze meter ("NDH5000" manufactured by Nippon Denshoku Industries Co., Ltd.), haze and total light transmission were measured in accordance with JIS K7136 and JIS K7361-1, respectively.

(4) Adhesive Strength

<Measurement of Adhesive Strength Before Photocuring>

With respect to the adhesive sheet laminates 1 to 12 prepared in the examples and the comparative examples, one release film was peeled off, and, as a backing film, a polyethylene terephthalate film ("COSMOSHINE A4300" manufactured by Toyobo Co., Ltd., 100 μm thick) was roll-pressed and bonded using a hand roller.

This laminate was cut into a strip shape 10 mm in width×150 mm in length. The remaining release film was peeled off, and the exposed adhesive surface was roll-attached to soda lime glass using a hand roller.

An autoclave treatment (60° C., gage pressure: 0.2 MPa, 20 minutes) was performed for finish-attachment, thereby preparing a sample for the measurement of glass adhesive strength before photocuring.

The adhesive sheet was peeled off from glass while pulling the backing film at an angle of 180° at a peel rate of 60 mm/min, and the tensile strength was measured using a load cell, whereby the 180° peel strength to glass (N/cm) of the adhesive sheet before photocuring was measured.

<Measurement of Adhesive Strength after Photocuring>

With respect to the adhesive sheet laminates 1 to 10 prepared in the examples and the comparative examples, one release film was peeled off, and, as a backing film, a polyethylene terephthalate film ("COSMOSHINE A4300" manufactured by Toyobo Co., Ltd., 100 μm thick) was roll-pressed and bonded using a hand roller.

This laminate was cut into a strip shape 10 mm in width×100 mm in length. The remaining release film was peeled off, and the exposed adhesive surface was roll-attached to soda lime glass using a hand roller.

An autoclave treatment (60° C., gage pressure: 0.2 MPa, 20 minutes) was performed for finish-attachment, and then, from the backing film side, the adhesive sheet was irradiated with light using a high-pressure mercury lamp to an accumulated light dose of 2,000 mJ/cm$^2$ at a wavelength of 365 nm, thereby preparing a sample for the measurement of glass adhesive strength after photocuring.

The adhesive sheet was peeled off from glass while pulling the backing film at an angle of 180° at a peel rate of 60 mm/min, and the tensile strength was measured using a load cell, whereby the 180° peel strength to glass (N/cm) of the adhesive sheet after photocuring was measured.

(5) Shape Stability

With respect to the adhesive sheet laminates 1 to 12 prepared in the examples and the comparative examples, from one release film ("DIAFOIL MRQ" manufactured by Mitsubishi Chemical Corporation, 75 μm thick) side, the adhesive sheet was half-cut to a 30 mm×30 mm square in such a manner not to penetrate the other release film ("DIAFOIL MRV (V08)" manufactured by Mitsubishi Chemical Corporation, 100 μm thick).

The cut release film ("DIAFOIL MRQ" manufactured by Mitsubishi Chemical Corporation, 75 μm thick) was peeled off, and the exposed adhesive surface was covered with a release-treated polyethylene terephthalate film ("DIAFOIL MRT" manufactured by Mitsubishi Chemical Corporation, 50 μm thick).

The release film of each side was cut to 50 mm×50 mm, preparing a sample for shape stability evaluation before photocuring.

The sample for shape stability evaluation was cured for 300 hours in an environment with a temperature of 40° C. and a humidity of 90%, and the amount of glue overflow from the end faces of the cured adhesive sheet was observed.

The amount of glue overflow was determined as follows. With respect to the cut, cured adhesive sheet, the glue overflow distance in the center of each side was measured, and the average distance of the four sides was defined as the amount of glue overflow (mm).

When the adhesive sheet crushed after curing, and the amount of glue overflow was 1 mm or more, a rating of "C (poor)" was given, while when glue overflow was seen but was 1 mm or less, a rating of "B (good)" was given.

Incidentally, "<0.1 mm" in the table means that the amount of glue overflow is less than 0.1 mm, indicating that there is almost no glue overflow.

(6) Step Absorbability

On a peripheral edge portion (longer side: 3 mm, shorter side: 15 mm) of glass of 58 mm×110 mm×0.8 mm thick, a print with a thickness 30 to 35 μm was applied, thereby preparing a print-stepped glass plate having a central recess of 52 mm×80 mm.

The adhesive sheet laminate 1 to 12 obtained in the examples and the comparative examples were each cut to a dimension of 53 mm×81 mm. One release film was peeled off and roll-attached to soda lime glass (54 mm×82 mm×0.5 mm thick), and then the remaining other release film was peeled off, followed by vacuum-pressing and bonding (temperature: 25° C., press pressure: 0.13 MPa, press time: 1 minute) using a vacuum press in such a manner that the adhesive sheet covered the entire perimeter of the frame-shaped printed step of the print-stepped glass plate, thereby preparing evaluation samples.

The evaluation samples were autoclaved under the conditions of 40° C., 0.2 MPa, and 20 minutes, and then determined to Pass or Fail according to the following evaluation criteria.

B (good): No separation or microbubbles are seen around steps.

C (poor): separation or microbubbles are seen around steps.

(7) Hygrothermal Reliability
<Glass Plate Laminate Configuration>

With respect to the samples used for step absorbability evaluation, the adhesive sheet laminates 1 to 10 were irradiated with light from the print-stepped glass plate side using a high-pressure mercury lamp to an accumulated light dose of 2,000 mJ/cm² at 365 nm, thereby preparing durability evaluation samples.

With respect to the adhesive sheet laminates 11 and 12, the samples used for step absorbability evaluation were directly used as durability evaluation samples.

The evaluation samples were exposed to an 85° C. and 85% R.H. environment for 24 hours. Those showing no appearance defect were rated as "A (very good)", those in which no foaming or delamination was seen in the opening near the printed step, but the adhesive sheet under the print flowed out, causing the deformation of an end of the adhesive sheet, were rated as "B (good)", and those in which foaming or delamination was seen in the opening near the printed step were rated as "C (poor)."

<Resin Plate Laminate Configuration>

The release film was peeled off from each of the adhesive sheet laminates 1 to 12 obtained in the examples and the comparative examples, and a polyethylene terephthalate film ("COSMOSHINE A4300" manufactured by Toyobo Co., Ltd., 100 μm thick) was roll-pressed and bonded to the exposed surface using a hand roller.

This laminate was cut to 45 mm×90 mm. The remaining release film was peeled off, and the exposed adhesive surface was roll-attached to a polycarbonate resin surface of a polycarbonate-based resin plate ("Iupilon Sheet MR58" manufactured by Mitsubishi Gas Chemical Company, Inc., 50 mm×100 mm, 0.8 mm thick) using a hand roller.

The adhesive sheet laminates 1 to 10 were autoclaved (60° C., gage pressure: 0.2 MPa, 20 minutes), finish-attached, and then, from the film side, irradiated with light using a high-pressure mercury lamp to an accumulated light dose of 2,000 mJ/cm² at 365 nm, thereby preparing reliability evaluation samples.

The adhesive sheet laminates 11 and 12 were autoclaved (60° C., gage pressure: 0.2 MPa, 20 minutes), finish-attached, and thus obtained as reliability evaluation samples.

The evaluation samples were exposed to an 85° C. and 85% R.H. environment for 24 hours. Those showing no appearance defects, such as foaming and delamination, were rated as "B (good)", and those in which foaming or delamination was seen were rated as "C (poor)."

TABLE 5

|  |  | Examples | | | | | | |
|---|---|---|---|---|---|---|---|---|
|  |  | 1 | 2 | 3 | 4 | 5 | 6 | 7 |
| Adhesive sheet laminate | | 1 | 2 | 3 | 4 | 5 | 6 | 7 |
| Intermediate layer-forming resin composition | | 1 | 2 | 3 | 4 | 5 | 1 | 6 |
| Intermediate layer thickness (μm) | | 210 | 100 | 100 | 100 | 80 | 100 | 75 |
| Adhesive layer-forming resin composition | | 1 | 1 | 3 | 1 | 1 | 2 | 1 |
| Adhesive layer thickness (μm) | | 20 | 40 | 30 | 40 | 40 | 40 | 40 |
| Adhesive sheet total thickness | | 250 | 180 | 160 | 180 | 160 | 180 | 155 |
| Intermediate layer viscosity (kPa·s) | 70° C. | 2.7 | 1.8 | 2.3 | 1.4 | 1.5 | 2.7 | 2.6 |
|  | 100° C. | 0.6 | 0.5 | 0.6 | 0.5 | 0.6 | 0.6 | 0.5 |
| Adhesive layer viscosity (kPa·s) | 70° C. | 1.3 | 1.3 | 1.7 | 1.3 | 1.3 | 1.9 | 1.3 |
|  | 100° C. | 0.3 | 0.3 | 0.3 | 0.3 | 0.3 | 0.4 | 0.3 |
| Intermediate layer Tanδ | 90° C. | 1.3 | 0.8 | 1.4 | 1.6 | 1.6 | 1.3 | 1.4 |
| Adhesive layer Tanδ | 90° C. | 2.1 | 2.1 | 2.2 | 2.1 | 2.1 | 1.0 | 2.1 |
| Holding force | 40° C. | 1.3 mm | 1 mm | 2.2 mm | 0.7 mm | 1 mm | 2.5 mm | 3 mm |
|  | 60° C. | 9 min | 6 min | 11 min | 8 min | 21 min | 8 min | 4 min |
| Optical characteristics | Transmission (%) | 91 | 91 | 91 | 91 | 91 | 89 | 91 |
|  | Haze (%) | 0.3 | 0.3 | 0.3 | 0.3 | 0.3 | 2 | 0.3 |
| Adhesive strength (N/cm) | Before curing | 11 | 8 | 3 | 6 | 7 | 1 | 9 |
|  | After photocuring | 8 | 4 | 12 | 9 | 9 | 5 | 5 |
| Shape stability | Overflow distance (mm) | <0.1 | 0.2 | 0.2 | 0.4 | 0.2 | 0.2 | 0.2 |
|  | Evaluation | B | B | B | B | B | B | B |
| Step absorbability | Evaluation | B | B | B | B | B | B | B |
| Hygrothermal reliability | Glass plate lamination | B | B | A | A | A | B | A |
|  | Resin plate lamination | A | A | B | A | A | B | A |
| Overall evaluation | | B | B | B | A | A | B | A |

TABLE 5-continued

|  |  | Examples | Comparative Examples | | | |
|---|---|---|---|---|---|---|
|  |  | 8 | 1 | 2 | 3 | 4 |
| Adhesive sheet laminate | | 8 | 9 | 10 | 11 | 12 |
| Intermediate layer-forming resin composition | | 1 | — | COP | — | — |
| Intermediate layer thickness (μm) | | 210 | — | 100 | — | — |
| Adhesive layer-forming resin composition | | 1 | 1 | 1 | Acrylic adhesive | 4 |
| Adhesive layer thickness (μm) | | 20 | 180 | 40 | 180 | 200 |
| Adhesive sheet total thickness | | 250 | 180 | 180 | 180 | 200 |
| Intermediate layer viscosity (kPa · s) | 70° C. | 6.1 | — | — | — | — |
| | 100° C. | 2.3 | — | — | — | — |
| Adhesive layer viscosity (kPa · s) | 70° C. | 1.3 | 1.3 | 1.3 | 13 | 2.6 |
| | 100° C. | 0.3 | 0.3 | 0.3 | 11 | 2.2 |
| Intermediate layer Tanδ | 90° C. | 1.3 | — | — | — | — |
| Adhesive layer Tanδ | 90° C. | 2.1 | 2.1 | 2.1 | 0.2 | 0.2 |
| Holding force | 40° C. | 1 mm | 45 min | 11 min | <0.2 mm | <0.2 mm |
| | 60° C. | 9 min | 1 min | 3 min | <0.2 mm | 0.2 mm |
| Optical characteristics | Transmission (%) | 91 | 91 | 91 | 91 | 91 |
| | Haze (%) | 0.3 | 0.3 | 0.3 | 0.3 | 0.3 |
| Adhesive strength (N/cm) | Before curing | 10 | 7 | 6 | 4 | 6 |
| | After photocuring | 8 | 6 | 5 | — | — |
| Shape stability | Overflow distance (mm) | <0.1 | 1.1 | 0.2 | <0.1 | 0.3 |
| | Evaluation | B | C | B | B | B |
| Step absorbability | Evaluation | B | B | C | C | B |
| Hygrothermal reliability | Glass plate lamination | A | C | C | C | B |
| | Resin plate lamination | A | A | C | B | C |
| Overall evaluation | | A | C | C | C | C |

The adhesive sheets of the examples not only had excellent step absorbability and hygrothermal reliability, but also resulted in excellent shape stability because of the storage stability secured by the intermediate layer having a specific crosslinked structure.

In addition, in the examples where a copolymer of a monomer component containing a hydrophilic (meth)acrylate monomer was used as a (meth)acrylic copolymer to serve as a material for forming an adhesive layer (Examples 1, 2, 4, 5, 7, and 8), high reliability was exerted in the laminate configuration with a resin plate.

In addition, in the examples where the intermediate layer had a chemically crosslinked structure (Examples 3, 4, 5, 7, and 8), even the printed portion-provided part of the adhesive sheet, where light hardly reaches and which is unlikely to be photocured, did not flow out in the durability test, and it was possible to retain a certain shape.

In contrast, the adhesive sheet of Comparative Example 1 is formed only of an adhesive layer having hot-meltability, and was poor in shape stability.

In addition, in the reliability test of the glass plate laminate configuration, the adhesive sheet on the back of the print flowed out, and glue overflow occurred at an end.

In Comparative Example 2, a non-(meth)acrylic, high-rigidity film substrate is used as an intermediate layer. Therefore, floating occurred near the printed step, and, also in the durability test, bubbles grew from such a float as a starting point, resulting in poor reliability.

The adhesive sheet of Comparative Example 3 is formed only of a high-cohesion adhesive layer having no hot-meltability. Although the shape stability was excellent, the step absorbability was poor.

The adhesive sheet of Comparative Example 4 is formed only of a flexible adhesive layer having no hot-meltability. Its cohesion was low, and foaming occurred in the durability test of the resin plate laminate configuration, resulting in poor reliability.

The invention claimed is:

1. A photocurable adhesive sheet, comprising:
a first adhesive layer;
a second adhesive layer; and
an intermediate layer interposed between the first adhesive layer and the second adhesive layer,
wherein the intermediate layer is a layer that is formed from a resin composition comprising a (meth)acrylic copolymer as a main component resin and has a chemically crosslinked structure,
wherein the intermediate layer has a viscosity higher than that of the first adhesive layer and/or the second adhesive layer in a temperature range of from 70 to 100° C.
wherein the first adhesive layer and/or the second adhesive layer is a photocurable resin layer that is formed from a photocurable resin composition, and
wherein a fall time in measurement of holding force at 40° C. under a load of 1 N/cm$^2$ is 60 minutes or more, while a fall time in measurement of holding force at 60° C. under a load of 1 N/cm² is less than 60 minutes.

2. The photocurable adhesive sheet of claim 1, wherein the crosslinked structure of the intermediate layer is a physically and chemically crosslinked structure.

3. The photocurable adhesive sheet of claim 1, wherein the intermediate layer is formed from a resin composition comprising a crosslinker in addition to the main component resin, and
wherein the crosslinked structure of the intermediate layer is a crosslinked structure formed by a reaction between the (meth)acrylic copolymer and the crosslinker, a crosslinked structure formed by a reaction between the (meth)acrylic copolymers, a crosslinked structure formed by a reaction between the crosslinkers, or two or more of these crosslinked structures.

4. The photocurable adhesive sheet of claim 3, wherein the crosslinker is a photocrosslinker, an isocyanate-based crosslinker, or both.

5. The photocurable adhesive sheet of claim 4, comprising a polyfunctional monomer as the photocrosslinker.

6. The photocurable adhesive sheet of claim 5, wherein the polyfunctional monomer comprises a hydroxyl group, a carboxyl group, and/or an amino group, as a functional group, and
wherein, in the intermediate layer, a chemical bond is formed between the functional group(s) and an isocyanate group of the isocyanate-based crosslinker.

7. The photocurable adhesive sheet of claim 4, wherein the (meth)acrylic copolymer that serves as a main component resin of the intermediate layer comprises a hydroxyl group, a carboxyl group, and/or an amino group, as a functional group, and
wherein, in the intermediate layer, a chemical bond is formed between the functional group(s) and an isocyanate group of the isocyanate-based crosslinker.

8. The photocurable adhesive sheet of claim 1, wherein the (meth)acrylic copolymer that serves as a main component resin of the intermediate layer is a copolymer comprising a hydrophilic (meth)acrylate monomer as a copolymerization component.

9. The photocurable adhesive sheet of claim 1, wherein the (meth)acrylic copolymer that serves as a main component resin of the intermediate layer is a graft copolymer obtained by polymerizing a monomer mixture comprising a vinyl monomer and a macromonomer having a number average molecular weight in a range of from 500 to 100,000.

10. The photocurable adhesive sheet of claim 1, wherein the photocurable resin composition comprises a (meth)acrylic copolymer as a main component resin, a crosslinker, and a photoinitiator.

11. The photocurable adhesive sheet of claim 1, wherein the first adhesive layer, the second adhesive layer, and the intermediate layer each comprises a crosslinker, and
wherein a mass proportion (in each layer) of the crosslinker in the first adhesive layer, the second adhesive layer, or both layers is higher than a mass proportion (in the intermediate layer) of the crosslinker in the intermediate layer.

12. The photocurable adhesive sheet of claim 1, wherein a thickness of the first adhesive layer (X1), a thickness of the second adhesive layer (X2), and a thickness of the intermediate layer (Y) satisfy a relation $$X1 \leq Y \text{ and } X2 \leq Y.$$

13. The photocurable adhesive sheet of claim 1, wherein a thickness of the first adhesive layer (X1) and a thickness of the second adhesive layer (X2) are 50 μm or less,
wherein a thickness of the intermediate layer (Y) is 500 μm or less, and
wherein a total thickness of the photocurable adhesive sheet is in a range of from 50 μm to 600 μm.

14. The photocurable adhesive sheet of claim 1, wherein a 180° peel strength of the photocurable adhesive sheet to glass is 1 N/cm or more, and,
wherein, after the photocurable adhesive sheet is attached to glass and irradiated with light to an accumulated light irradiation dose of 2,000 mJ/m², the 180° peel strength of the photocurable adhesive sheet to glass is 3 N/cm or more.

15. The photocurable adhesive sheet of claim 1, wherein the first adhesive layer and the second adhesive layer independently comprise a (meth)acrylic copolymer as a main component resin.

16. The photocurable adhesive sheet of claim 1, wherein the first adhesive layer and the second adhesive layer independently comprise a (meth)acrylic copolymer as a main component resin,
wherein the first adhesive layer, the second adhesive layer, and the intermediate layer each contain a crosslinker, and a mass proportion of the crosslinker in the first adhesive layer and the second adhesive layer is higher than the mass proportion of the crosslinker in the intermediate layer, and
wherein, in the first adhesive layer and/or the second adhesive layer, a chemical bond is formed in the (meth)acrylic copolymer between an isocyanate group and at least one functional group selected from the group consisting of a hydroxyl group, a carboxyl group, and an amino group.

17. An adhesive sheet laminate, comprising:
the photocurable adhesive sheet of claim 1 and a release film, laminated together.

18. A laminate configured for an image display device, the laminate comprising:
photocurable adhesive sheet of claim 1, interposed between two constituent members for an image display device.

19. The laminate of claim 18, wherein constituent members for an image display device are a combination of two or more selected from the group consisting of a touch sensor, an image display panel, a surface protection panel, a polarizing film, and a phase difference film.

20. An image display device, comprising:
the laminate of claim 18.

* * * * *